(12) United States Patent
Choi et al.

(10) Patent No.: US 10,327,313 B2
(45) Date of Patent: Jun. 18, 2019

(54) LIGHTING DEVICES AND LIGHTING SYSTEMS

(71) Applicant: SAMSUNG ELECTRONICS CO., LTD., Suwon-si, Gyeonggi-do (KR)

(72) Inventors: Seung-Kwan Choi, Suwon-si (KR); Ho-Chan Cho, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/824,030

(22) Filed: Nov. 28, 2017

(65) Prior Publication Data

US 2018/0235057 A1    Aug. 16, 2018

(30) Foreign Application Priority Data

Feb. 10, 2017    (KR) .................. 10-2017-0018403

(51) Int. Cl.
*H05B 37/02* (2006.01)
*G08C 17/02* (2006.01)
(Continued)

(52) U.S. Cl.
CPC ......... *H05B 37/0272* (2013.01); *F21V 29/70* (2015.01); *G08C 17/02* (2013.01);
(Continued)

(58) Field of Classification Search
CPC ............ H05B 37/0272; H05B 33/0845; H05B 37/0218; H05B 33/0854; H05B 33/0842; H05B 37/02; H05B 33/0863; H05B 33/0872; H05B 33/0809; H05B 33/0869; H05B 33/0815; H05B 37/0245; H05B 33/0827; H05B 33/089; H05B 33/0812; H05B 33/0848; H05B 33/0866;
(Continued)

(56) References Cited

U.S. PATENT DOCUMENTS 9,295,144 B2 * 3/2016 Bora .................. H05B 33/0863
9,324,231 B2 * 4/2016 Kim .......................... G08B 5/36
(Continued)

FOREIGN PATENT DOCUMENTS

JP    2015-084295 A    4/2015
KR    20-2011-0002372 U    3/2011
(Continued)

*Primary Examiner* — Vibol Tan
(74) *Attorney, Agent, or Firm* — Lee & Morse, P.C.

(57) ABSTRACT

A lighting device includes a light emitting module, a driver, a wireless communication module, and a signal converter. The light emitting module includes light emitting elements and an antenna pattern. The light emitting elements are mounted on a first surface of a circuit board. The antenna pattern is in the first surface or a second surface of the circuit board. The driver sets current applied to the light emitting elements based on control data including current setting information. The control data is wirelessly received through the antenna pattern from an external user terminal. The light emitting module includes a wireless communication module directly connected to the antenna pattern to receive the control data, and a signal converter to convert the control data to a control signal and provide the control signal to the driver.

16 Claims, 19 Drawing Sheets

(51) Int. Cl.
*H05B 33/08* (2006.01)
*F21V 29/70* (2015.01)

(52) U.S. Cl.
CPC ..... *H05B 33/0803* (2013.01); *H05B 33/0842* (2013.01); *H05B 33/0845* (2013.01); *H05B 33/0857* (2013.01); *Y02B 20/42* (2013.01)

(58) Field of Classification Search
CPC ... H05B 5/0062; F21Y 2115/10; G08C 17/02; G08C 2201/40; G08C 2201/93; Y02B 20/48; Y02B 20/30; Y02B 20/46
See application file for complete search history.

(56) References Cited

U.S. PATENT DOCUMENTS

| | | | |
|---|---|---|---|
| 9,408,282 B1 | 8/2016 | Springer | |
| 9,548,797 B1 * | 1/2017 | Green | H04B 5/0031 |
| 9,565,744 B2 * | 2/2017 | Lai | H05B 37/0272 |
| 9,686,833 B2 * | 6/2017 | Bong | H05B 33/0845 |
| 9,756,705 B2 * | 9/2017 | Shen | H05B 37/0272 |
| 9,810,414 B2 * | 11/2017 | Kim | F21V 23/0435 |
| 9,854,651 B2 * | 12/2017 | Lai | H05B 37/0272 |
| 9,863,623 B2 * | 1/2018 | Kim | F21V 3/00 |
| 9,881,493 B2 * | 1/2018 | Kim | G08C 17/02 |
| 9,897,300 B2 * | 2/2018 | Kim | F21V 23/06 |
| 9,918,373 B2 * | 3/2018 | Cartrette | H05B 37/0272 |
| 2011/0031889 A1 | 2/2011 | Shim | |
| 2014/0239852 A1 * | 8/2014 | Kim | H05B 33/0803 315/312 |
| 2015/0289349 A1 * | 10/2015 | Kim | F21K 9/23 315/34 |
| 2015/0327349 A1 | 11/2015 | Lee et al. | |
| 2015/0373792 A1 * | 12/2015 | Kim | H05B 33/0824 315/201 |
| 2016/0040869 A1 | 2/2016 | Lukashevich et al. | |
| 2016/0286628 A1 * | 9/2016 | Cho | H05B 37/0272 |
| 2016/0345416 A1 | 11/2016 | Brochu et al. | |

FOREIGN PATENT DOCUMENTS

| | | | |
|---|---|---|---|
| KR | 10-2012-0007886 A | 1/2012 | |
| KR | 10-2015-0098031 A | 8/2015 | |
| KR | 10-2016-0055014 A | 5/2016 | |
| WO | WO-2017212745 A1 * | 12/2017 | H04M 19/04 |

* cited by examiner

LIGHTING DEVICES AND LIGHTING SYSTEMS

CROSS-REFERENCE TO RELATED APPLICATION

Korean Patent Application No. 10-2017-0018403, filed on Feb. 10, 2017, and entitled, "Lighting Devices and Lighting Systems," is incorporated by reference herein in its entirety.

BACKGROUND

1. Technical Field

One or more embodiments described herein relate to lighting devices and systems.

2. Description of the Related Art

A variety of lighting devices have been developed. Examples include incandescent light bulbs, fluorescent lamps, and lighting devices employing light emitting diodes (LEDs). LEDs have improved control characteristics, relatively fast response speed, relatively high degree of electrophotic conversion efficiency, relatively long life span, relatively low power consumption, and a relatively high degree of luminosity.

LEDs have a relatively high degree of photoelectric conversion efficiency and thus consume less power. Because LEDs do not emit light thermally, no preheating time is required. As a result, LEDs exhibit fast response times, e.g., they may be turned on and off quickly.

Also, because gas or a filament is not employed, LEDs have various advantages. For example, LEDs are comparatively more resistant to impact, are safer to use, and employ a stable direct current (DC) lighting method which consumes less power. LEDs may also perform extended repetitive pulse operation, may reduce optic nerve fatigue, may have a semi-permanent life span, may provide an illumination effect with various colors, and may have a compact configuration when used as a light source.

SUMMARY

In accordance with one or more embodiments, a lighting device includes a light emitting module including a plurality of light emitting elements and an antenna pattern, the plurality of light emitting elements mounted on a first surface of a circuit board, the antenna pattern in the first surface or a second surface of the circuit board, the second surface opposed to the first surface; and a driver to set current applied to the plurality of light emitting elements based on control data including current setting information, the control data to be wirelessly received through the antenna pattern from an external user terminal, wherein the light emitting module includes: a wireless communication module directly connected to the antenna pattern, the wireless communication module to receive the control data; and a signal converter connected to the wireless communication module, the signal converter to convert the control data to a control signal and to provide the control signal to the driver.

In accordance with one or more other embodiments, a lighting device including a light emitting module on which a plurality of light emitting elements are mounted, the lighting device to be controlled by control data to be wirelessly received; and a user terminal to control a current applied to the plurality of light emitting elements based on the control data when the user terminal is connected to the lighting device through a wireless communication link, the lighting device including: the light emitting module including the plurality of light emitting elements and an antenna pattern, the light emitting elements mounted on a first surface of a circuit board, the antenna pattern in the first surface or a second surface of the circuit board, the second surface opposed to the first surface; and a driver to set current applied to the plurality of light emitting elements based on the control data including current setting information, the control data to be wirelessly received through the antenna pattern from the user terminal, wherein the light emitting module includes: a first wireless communication module directly connected to the antenna pattern, the first wireless communication module to receive the control data; and a signal converter connected to the first wireless communication module, the signal converter to convert the control data to a control signal and to provide the control signal to the driver.

In accordance with one or more other embodiments, a lighting apparatus includes an antenna to receive control data; a plurality of light emitters; and a driver to set a current to be applied to the plurality of light emitters based on the control data received by the antenna, wherein the antenna is to receive the control data based on a predetermined wireless protocol.

BRIEF DESCRIPTION OF THE DRAWING

Features will become apparent to those of skill in the art by describing in detail exemplary embodiments with reference to the attached drawings in which.

DETAILED DESCRIPTION

Figure 1:
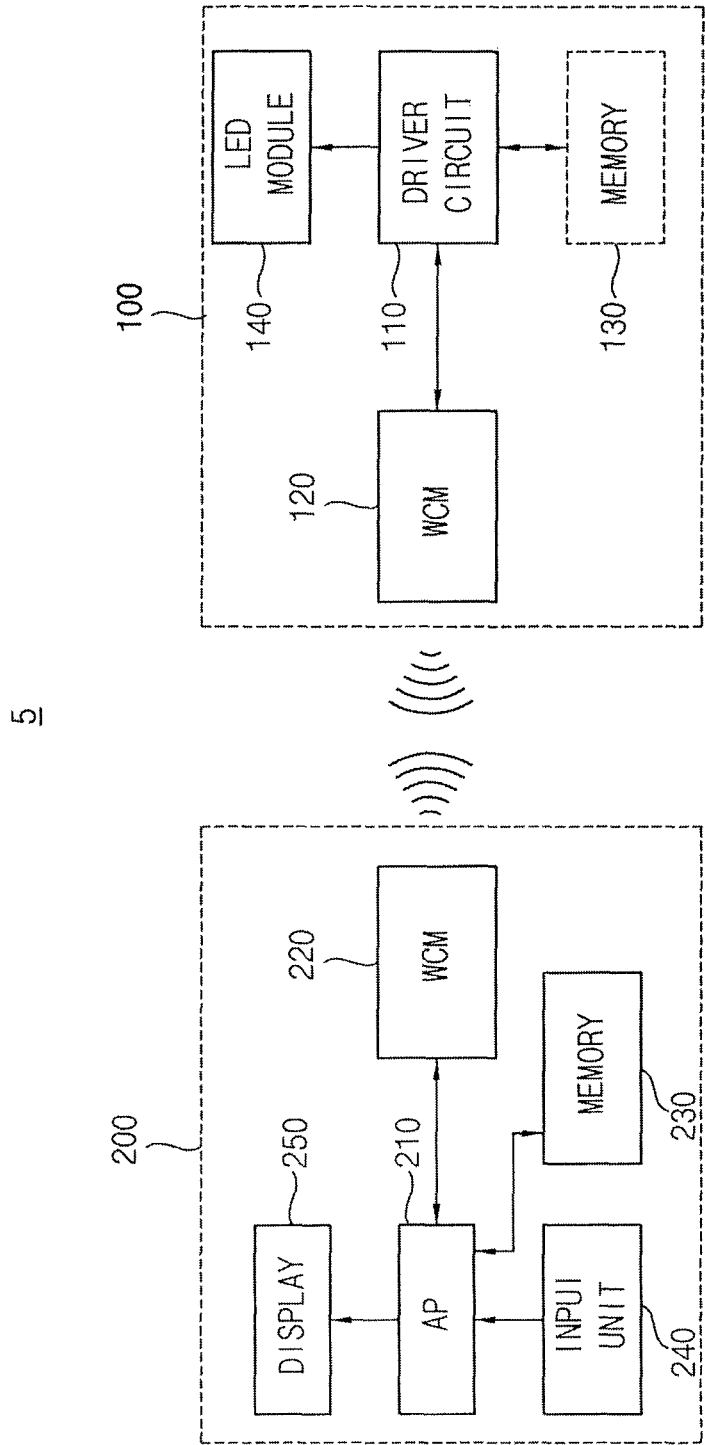
FIG. 1 illustrates an embodiment of a lighting system.

FIG. 1 illustrates an embodiment of a lighting system 5 which includes a lighting device 100 and a user terminal 200. The lighting device 100 may be controlled via wireless communications, e.g., near field communications (NFC) or other short-range wireless communications protocols. In one embodiment, Bluetooth™ technology may be used to facilitate short-range wireless communications. The lighting device 100 may be controlled, for example, via Internet of Things (IoT) or Zigbee.

In order to establish a wireless network between pieces of Bluetooth equipment, mutual authentication through a pairing procedure may be performed between the pieces of equipment. Pairing may employ, for example, a 'discovery-based' scheme. A 'discovery-based' scheme may refer to a scheme that includes scanning, by a device that wants pairing, for devices in a vicinity thereof through an inquiry process, discovering a device address as unique identification information of a counterpart device, and exchanging personal identification number (PIN) codes with the counterpart device using the device address to thus perform authentication.

An example of a pairing procedure will be described. First, a device attempting pairing starts an inquiry process, e.g. a process of scanning devices in the vicinity. A scan time may be tens of seconds. Scanning refers to a process of discovering devices located within the vicinity of the device attempting pairing, rather than scanning for a particular device. Thus, the device attempting pairing may wait for a sufficient period of time so that the responses with respect to the scan requests are appropriately received.

In response to the scanning requests, accessible devices within the surrounding vicinity and having, for example, Bluetooth modules, respectively, may transfer a device address thereof. Thus, the device attempting pairing may obtain the device addresses of the nearby accessible devices through the inquiry process. Although the device addresses of the nearby accessible devices may be obtained through the foregoing process, the user may not understand to which device each device address corresponds because the device addresses are configured in hexadecimal values. In order to provide a display using names including characters and numbers, which a user can easily understand, identification names (PIN codes) may also be obtained from the nearby devices.

For example, the device attempting pairing may request identification names of the respective devices scanned using the obtained device addresses. The respective nearby devices may transfer an identification name thereof in response to the request.

The device attempting pairing may display a list of the identification names of the respective scanned devices on a display screen to allow the user to select a desired device. When the user discovers a device desired to be paired on the displayed list, the user may select the device from the display screen. When a device desired by the user is not in the scan results, determining process may determine whether a current time is within a desired (or, alternatively pre-set) time, and/or whether scanning is to be performed again until a corresponding device is discovered. Thus, when a large number of Bluetooth devices exist in the vicinity of the device attempting pairing, it may not be easy to discover a desired device and may require a great amount of time for scanning.

The device attempting pairing may receive an identification name input from the user for pairing. For example, the user may directly input a scanned identification name. Then, the device attempting pairing may request that a user selected device perform registration, using the received identification name. When the value of the identification name is identical to an identification name of the device requested to be paired, the registration succeeds and the device requested to be paired transmits a response thereto. The two devices are then paired and communicate.

Bluetooth employs a peer-to-peer concept. Thus, in order to perform communications with a new device, the foregoing pairing procedure is performed with respect to the new device. The user performs the processes from device scanning to inputting a PIN code, for the purpose of pairing.

Thus, if a pairing process is applied to a lighting device having a Bluetooth module, the user is supposed to perform an individual authentication process on all lighting devices, including a lighting device that the user wants to control. Therefore, the authentication process requires a great amount of time.

Referring to FIG. 1, the lighting device 100 includes a driver circuit 110, a wireless communication module 120 (e.g., a Bluetooth module), a memory 130, and a light emitting module 140 (e.g., a light emitting diode (LED) module). In one embodiment, a plurality of lighting devices 100 may be provided. The driver circuit 110, the wireless communication module 120, and the memory 130 may be configured as a single body with the light emitting module 140 or may be configured as separate units coupled to the light emitting module 140.

The lighting device 100 may include a driver circuit (or lighting controller) 110, a wireless communication module 120, a memory 130, and an LED module 140. In one embodiment, a plurality of lighting devices 100 may be provided. The driver circuit 110, the wireless communication module 120, and the memory 130 may be configured as a single body with the LED module 140 or may be configured as separate units coupled to the LED module 140.

The driver circuit 110 may process a wireless data signal received via the wireless communication module 120, store the processed data signal in the memory 130, and control the light emitting module 140 based on the data signal stored in the memory 130.

Any light emitting element may be used as the light emitting module 140, as long as it emits light when an electrical signal is applied thereto. For example, at least one light emitting diode (LED) may be used as the light emitting module 140. The light emitting module 140 may change at least one of a color, a color temperature, brightness, or a chroma of emitted light using the driver circuit 110.

The user terminal 200 includes an application processor 210, a wireless communication module such as a Bluetooth module 220, a memory 230, an input unit 240, and a display unit 250. The application processor 210 may control operations of the wireless communication module, the memory 230, the input unit 240, and the display unit 250 to control a general operation of the user terminal 200. For example, when the user terminal 200 is a smartphone, the application processor 210 may perform control and processing in relation to a voice call, data communication, a video call, etc.

The input unit 240 may generate key input data input to control an operation of the user terminal 200. The input unit 240 may include a keypad, a dome switch, a touch pad, a jog wheel, a jog switch, a finger mouse, etc. For example, when the touch pad and the display unit 250 are overlaid in a layered manner, the touch pad may constitute a touch screen.

The memory 230 may store an application to be used by the application processor 210 to perform processing and controlling operations and may serve to temporarily store input or output data. As the memory 230, various types of storage devices may be used, e.g., a flash memory type, a hard disk type, or the like. In the present embodiment, a flash memory type may be used.

The display unit 250 may output information processed in the user terminal 200, as visual information that may be recognized by the user. When the user terminal is a smartphone, user interface (UI) or a graphic user interface (GUI) related to the smartphone may be displayed.

When a touch screen is formed by overlaying the display unit 250 and the input unit 240 in a layered manner, the display unit 250 may also be used as the input unit 240. When the display unit 250 is configured as a touch screen, it may include a touch screen panel, a touch screen panel controller, etc. For example, the touch screen panel may be a transparent panel attached to an outer side and may be connected to the interior of the user terminal 200. The touch screen panel may await a contact result, e.g., a touch. When a touch is applied, the touch screen panel may transmit corresponding signals to the touch screen panel controller. The touch screen panel controller may process the signals and transmit corresponding data to the application processor 210 to allow the application processor 210 to recognize whether a touch has been applied or to which region of the touch screen, the touch was applied.

The display unit 250 may be, for example, a liquid crystal display (LCD), a thin film transistor-liquid crystal display (TFT-LCD), an organic light emitting diode (OLED) display, a flexible display, or another type of display.

Figure 2:
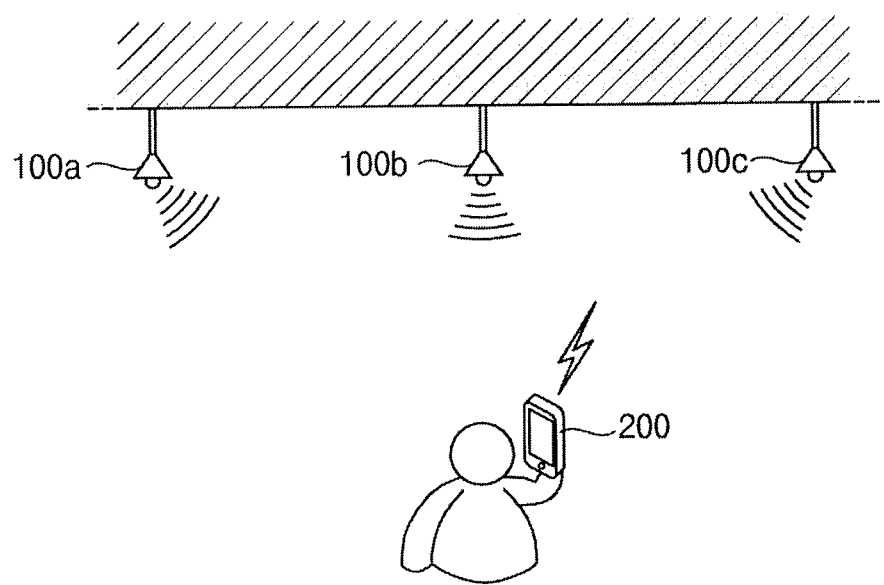
FIG. 2 illustrates a layout embodiment of the lighting system.

FIG. 2 is a layout embodiment of the lighting system in FIG. 1. In FIG. 2, three lighting devices 100a, 100b, and 100c corresponding to the lighting device 100 are provided as an example. Referring to FIG. 2, when a plurality of lighting devices 100a, 100b, and 100c are provided in vicinity of the user terminal 200, the user terminal 200 searches the lighting devices 100a, 100b, and 100c, and registers at least one of the lighting devices 100a, 100b, and 100c when a signal strength from the at least one of the lighting devices 100a, 100b, and 100c equals or exceeds a predetermined reference value.

Figure 3:
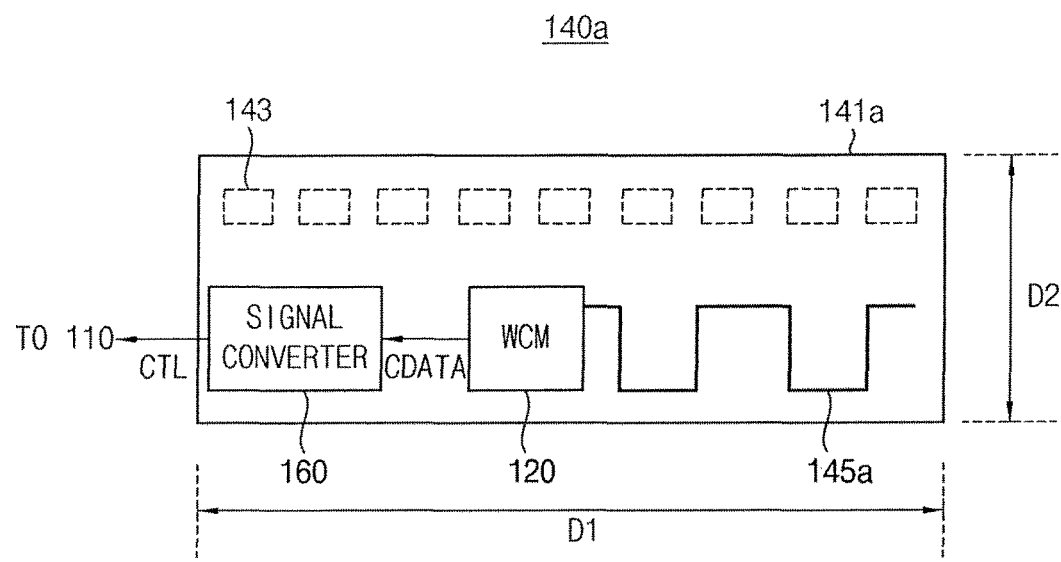
FIG. 3 illustrates an embodiment of a light emitting module.

FIG. 3 illustrates an embodiment of a light emitting module, which, for example, may be in the lighting system of FIG. 1. In FIG. 3, a circuit board 141a has a rectangular shape defined by a longer side D1 and a shorter side D2.

Referring to FIG. 3, a light emitting module 140a may include a plurality of light emitting elements 143, an antenna pattern 145a, the wireless communication module 120 and a signal converter 160. The light emitting elements 143 may be formed (or, mounted) on a first surface of the circuit board 141a. The antenna pattern 145a may be formed in the first surface of the circuit board 141a or a second surface of the circuit board 141a, which is opposed to the first surface. The antenna pattern 145a may be formed as a pattern of the circuit board 141a. The wireless communication module 120 is directly connected to the antenna pattern 145a may receive control data CDATA including current setting information from the user terminal 200 via the antenna pattern 145a. The antenna pattern 145a may be formed in the first surface or the second surface to have a meandering shape viewed from a direction perpendicular to the first surface of the circuit board 141a, such that the antenna pattern 145a does not overlap the light emitting elements 143, and a total length of the antenna pattern 145a is increased.

The signal converter 160 is connected to the wireless communication module 120, receives the control data CDATA from the wireless communication module 120, converts the control data CDATA to a control signal CTL, and provides the control signal CTL to the driver circuit 110.

In exemplary embodiments, the wireless communication module 120 may provide the contrail data CDATA to the signal converter 160 according to a universal asynchronous receiver transmitter (UART) interface and the signal converter 160 converts the control data CDATA to the control signal CTL, so that the control signal CTL corresponds to a digital addressable lighting interface (DALI) protocol, and provides the control signal CTL to the driver circuit 110.

DALI provides a digital interface for dimming with simple wiring, control of units, automatic dimming with logarithmic dimming behavior, and other similar features. Operating parameters (e.g., minimum/maximum fade level, fade time, and/or rate) may be stored in ballast memory. DALI also provides queries to get the dimming factor and a variety of status messages.

The total length of the antenna pattern 145a may be equal to or greater than half of a length of the longer side D1. Therefore, the total length of the antenna pattern 145a is much longer than a length of an antenna pattern when the antenna pattern is provided in the wireless communication module 120. As a result, the antenna pattern 145a may receive the control data CDATA from the user terminal 200 more efficiently and wireless communication capable distance between the user terminal 200 and the lighting device 100 may be increased.

Figure 4:
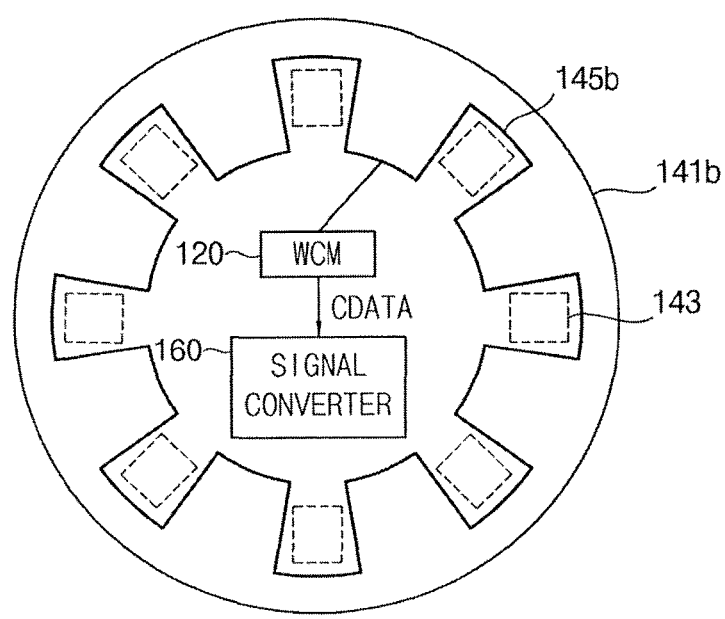
FIG. 4 illustrates another embodiment of the light emitting module.

FIG. 4 illustrates an embodiment of light emitting module 140b in the lighting system of FIG. 1. In FIG. 4, a circuit board 141b has a ring shape with a circumference.

Referring to FIG. 4, the light emitting module 140b may include a plurality of light emitting elements 143, an antenna pattern 145b, the wireless communication module 120, and a signal converter 160.

The light emitting elements 143 may be formed (or, mounted) on a first surface of the circuit board 141b. The antenna pattern 145b may be formed in the first surface of the circuit board 141b or a second surface of the circuit board 141b, which is opposed to the first surface. The antenna pattern 145a may be formed as a pattern of the circuit board 141b. The antenna pattern 145b may be formed in the first surface or the second surface to have a meandering shape viewed from a direction perpendicular to the first surface of the circuit board 141b, such that the antenna pattern 145b does not overlap the light emitting elements 143, and a total length of the antenna pattern 145b is increased. The wireless communication module 120 is directly connected to the antenna pattern 145b and may receive control data CDATA including current setting information from the user terminal 200 via the antenna pattern 145b.

The signal converter 160 is connected to the wireless communication module 120, receives the control data CDATA from the wireless communication module 120, converts the control data CDATA to the control signal CTL, and provides the control signal CTL to the driver circuit 110.

The total length of the antenna pattern 145b may be equal to or greater than the length of the circumference of the circuit board 141b. Therefore, the total length of the antenna pattern 145b is much longer than the length of an antenna pattern when the antenna pattern is provided in the wireless communication module 120. Thus, the antenna pattern 145b may receive the control data CDATA from the user terminal 200 more efficiently and wireless communication capable distance between the user terminal 200 and the lighting device 100 may be increased.

Figure 5:
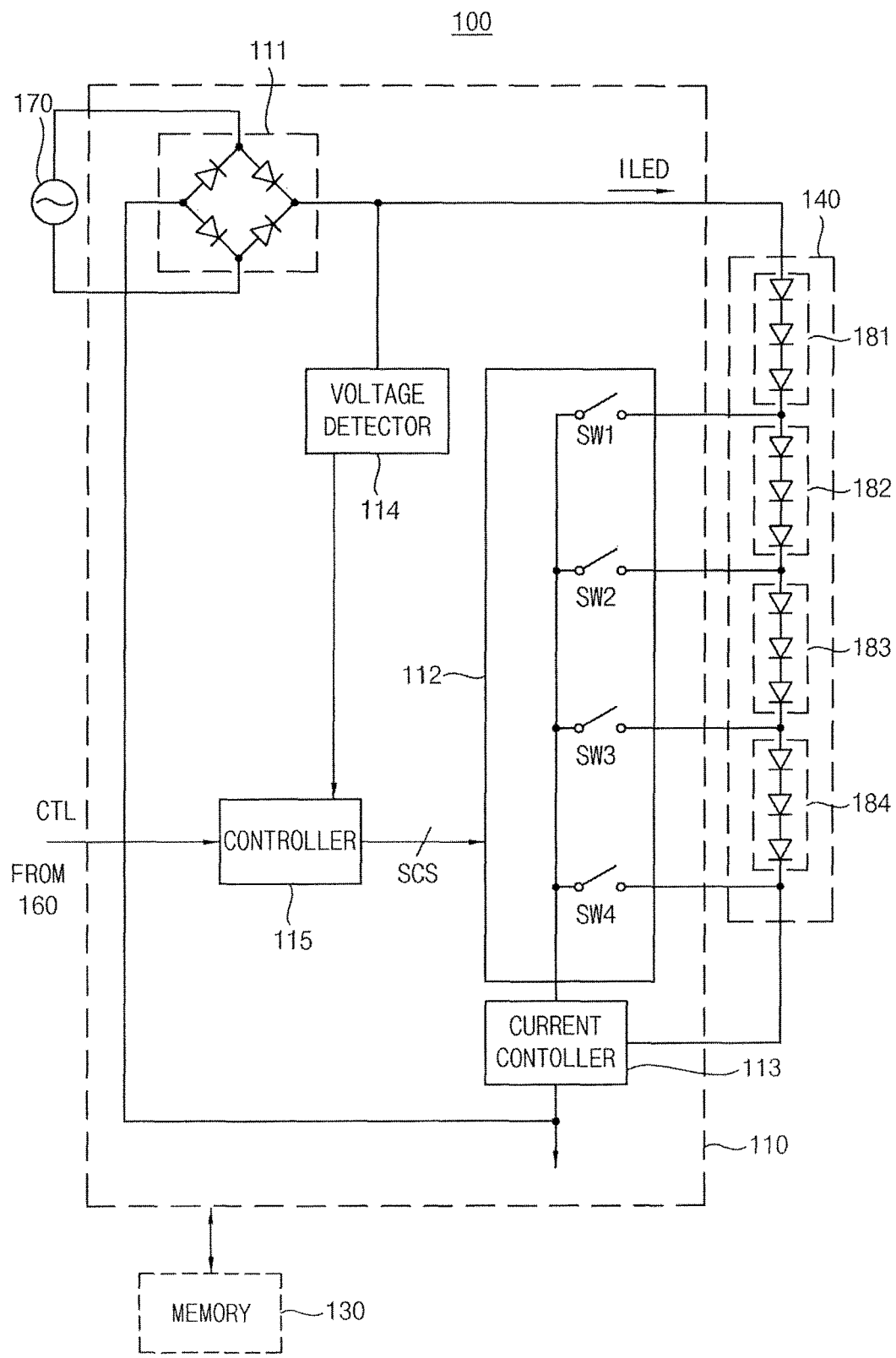
FIGS. 5 and 6 illustrate embodiments of a driver circuit.
Figure 6:
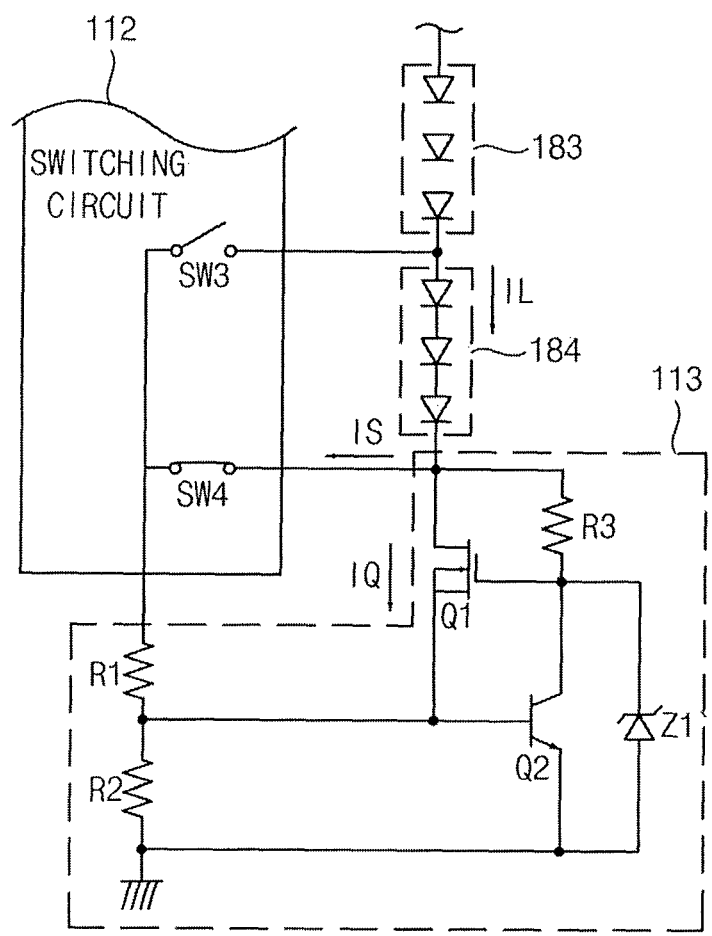

FIGS. 5 and 6 illustrates embodiments of circuit diagrams of driver circuits in the lighting system 100 of FIG. 1. Referring to FIG. 5, the lighting device 100 includes a driver circuit 110, a light emitting module 140, a memory 130, and a power supply 170. The power supply 170 may be a commercial alternating current (AC) power of 220V-60 Hz. The light emitting module 140 includes at least one LED arrays. The light emitting module 140 may include a plurality of LED arrays connected to one another in series or in parallel. Each of the plurality of LED arrays may include one or more LEDs. In FIG. 5, the light emitting module 140 includes a plurality of LED arrays 181 to 184. FIG. 5 illustrates a case in which the plurality of LED arrays 181 to 184 are connected to one another in series. However, unlike the case of FIG. 5, at least some of the plurality of LED arrays 181 to 184 may be connected to each other in parallel.

The driver circuit 110 includes a rectifier circuit 111, a switching circuit 112, a current controller 113, a voltage detector 114, and a controller 115. The switching circuit 112 includes internal switches SW1~SW4.

The rectifier circuit 111 may be implemented, for example, as a diode bridge and may full-wave rectify AC power output by the power supply 170 to generate driving power to the light emitting module 140. The controller 115 controls operations of a plurality of internal switches SW1 to SW4 based on a voltage magnitude of the driving power output from the rectifier circuit 111 and the control signal CTL, thereby operating the LED arrays in the light emitting module 140. The controller 115 provides switching control signals SCS to the internal switches SW1 to SW4 based on the voltage magnitude of the driving power detected by the voltage detector 114 and the control signal CTL to control on/off of the internal switches SW1 to SW4.

The current controller 113 may be a circuit provided separately from the switching circuit 112 and may include at least one switching element and a circuit element, such as a resistor or the like. When the current controller 113 is operated, a current flowing through the LED array in the light emitting module 140 may be dispersed into the switching circuit 112 and the current controller 113, and stress applied to the switching circuit 112 may be reduced. Therefore, since a relatively high level of current may be applied to the LED array, a brighter lighting device 100 may be implemented by including a high output LED in the light emitting module 140.

A voltage of the driving power output by the rectifier circuit 111 may have a waveform repeatedly increased and decreased in a single period. The controller 115 may control operations of the internal switches SW1 to SW4 on the basis of a voltage magnitude of the driving power detected by the voltage detector 114 and the control signal CTL, thereby determining whether or not to allow the LED arrays 181 to 184 to emit light. Hereinafter, a description will be made with reference to FIG. 7.

Figure 7:
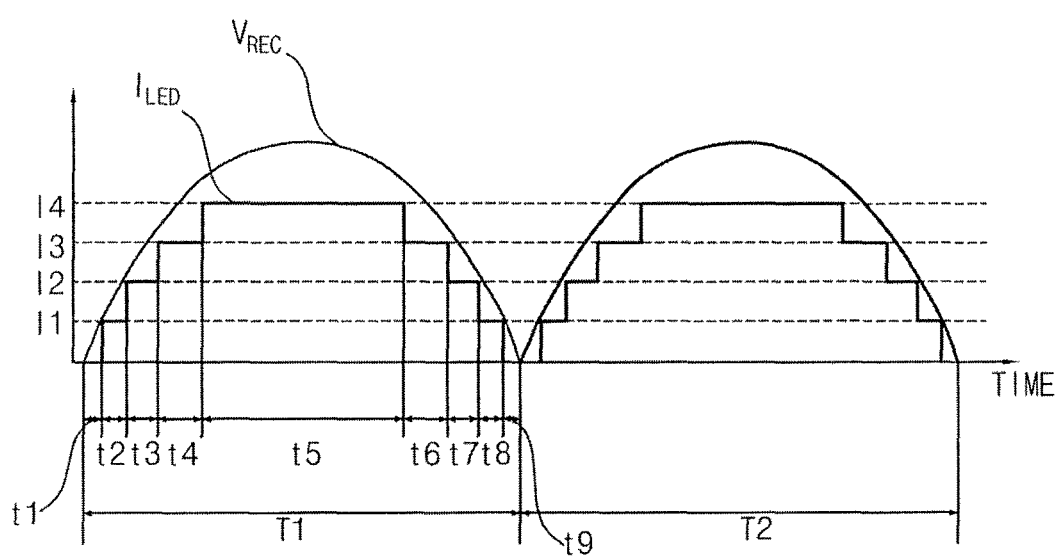
FIG. 7 illustrates a waveform embodiment for a driver circuit.

FIG. 7 illustrates a waveform embodiment for the driver circuit in FIGS. 5 and 6. Referring to FIG. 7, driving power VREC supplied to the LED arrays 181 to 184 may have waveforms repeated in every predetermined cycle. In an exemplary embodiment, since driving power VREC may be generated by full-wave rectifying a commercial AC power of 220V-60 Hz, it may have a peak voltage of 220V and a frequency of 120 Hz. The driving power VREC may include nine durations of t1-t9 in a single cycle T1. Since a voltage magnitude of the driving power VREC is relatively low in the first duration t1 and the ninth duration t9, a voltage sufficient to emit light from the LED arrays 181 to 184 may not be supplied. Therefore, driving current ILED may not be supplied to the LED arrays 181 to 184 in the first duration t1 and the ninth duration t9.

In the second duration t2 and the eighth duration t8, current I1 may be supplied to the LED array 181 by the driving power VREC. The voltage of the driving power VREC in the second duration t2 and the eighth duration t8 may be sufficient to drive the first LED array 181, but may be insufficient to drive the first and second LED arrays 181 and 182 together. Therefore, the controller 115 may set the current I1 to flow through the first LED array 181 and the first internal switch SW1 by turning only the first internal switch SW1 on, among the first to fourth internal switches SW1 to SW4.

The voltage of the driving power VREC in the third duration t3 and the seventh duration t7 may be sufficient to drive the first and second LED arrays 181 and 183, but may be insufficient to drive the first to third LED arrays 181 to 183 together. Therefore, the controller 115 may set the current I2 to flow through the first and second LED array 181 and 182 and second internal switch SW2 by turning only the second internal switch SW2 on and by turn the other switches SW1, SW3, and SW4 off, in the third duration t3 and the seventh duration t7. Similarly, the voltage of the driving power VREC in the fourth duration t4 and the sixth duration t6 may be sufficient to drive the first to third LED arrays 181 to 183, but may be insufficient to drive all of the first to fourth LED arrays 181 to 184 together. The controller 115 may set current I3 to pass through the first to third LED arrays 181 to 183 and the third internal switch SW3 by turning only the third internal switch SW13 on, in the fourth period t4 and the sixth period t6.

The voltage magnitude of the driving power VREC in the fifth duration t5 may be sufficient to drive all of the first to fourth LED arrays 181 to 184. Therefore, during the fifth period t5, the controller 115 may control all of the first to fourth LED arrays 181 to 184 to be operated by current I4 by turning the first to third internal switches SW1 to SW3 off and turning the fourth internal switch SW4 on.

As illustrated in the waveform diagram of FIG. 7, currents flowing in the switching circuit 112 may be different in the respective durations t1-t9 in a single cycle of the driving power VREC. For example, in the fifth duration t5, the current I4 having the highest level may flow through the fourth internal switch SW4 of the switching circuit 112. Therefore, the magnitude of the current I4 may be determined by a limiting current that may flow in the switching circuit 112 and, consequently, a maximum output of the light emitting module 140 may be determined by the limiting current that may flow in the switching circuit 112.

The current controller 113 may draw a portion of the current flowing in the LED arrays 181 to 184 in the fifth duration t5 in which the fourth internal switch SW4 is turned on, and thus may decrease the current flowing in the fourth internal switch SW4 during the fifth duration t5. As such, in the fifth duration t5 in which the switching circuit 112 receives the highest current stress, the limiting current of the driver circuit 110 may be increased since a portion of the current I4 introduced to the switching circuit 112 is dispersed into the current controller 113.

Referring to FIG. 6, the current controller 113 may include switching elements Q1 and Q2 (e.g., switches), resistors R1 to R3, and a zener diode Z1. The zener diode Z1 may be, for example, a clamping diode.

When the third internal switch SW3 is turned off and the fourth internal switch SW4 is turned on, current IL may flow through a path including the first to fourth LED arrays 181 to 184 and the fourth internal switch SW4. The magnitude of the current IL may be identical to the magnitude of the current I4 illustrated in the waveform of FIG. 7. When the current IL flows, a gate voltage of the first switching element Q1 may start to be increased by the resistor R3 and the zener diode Z1, and the first switching element Q1 may be turned on. When the first switching element Q1 is turned on, the current IL may be dispersed into current IS flowing in (e.g., through) the fourth internal switch SW4 of the switching circuit 112 and current IQ flowing in (e.g., through) the first switching element Q1. The waveform in a second period T1 is substantially the same as a waveform in the first period T1.

Figure 8:
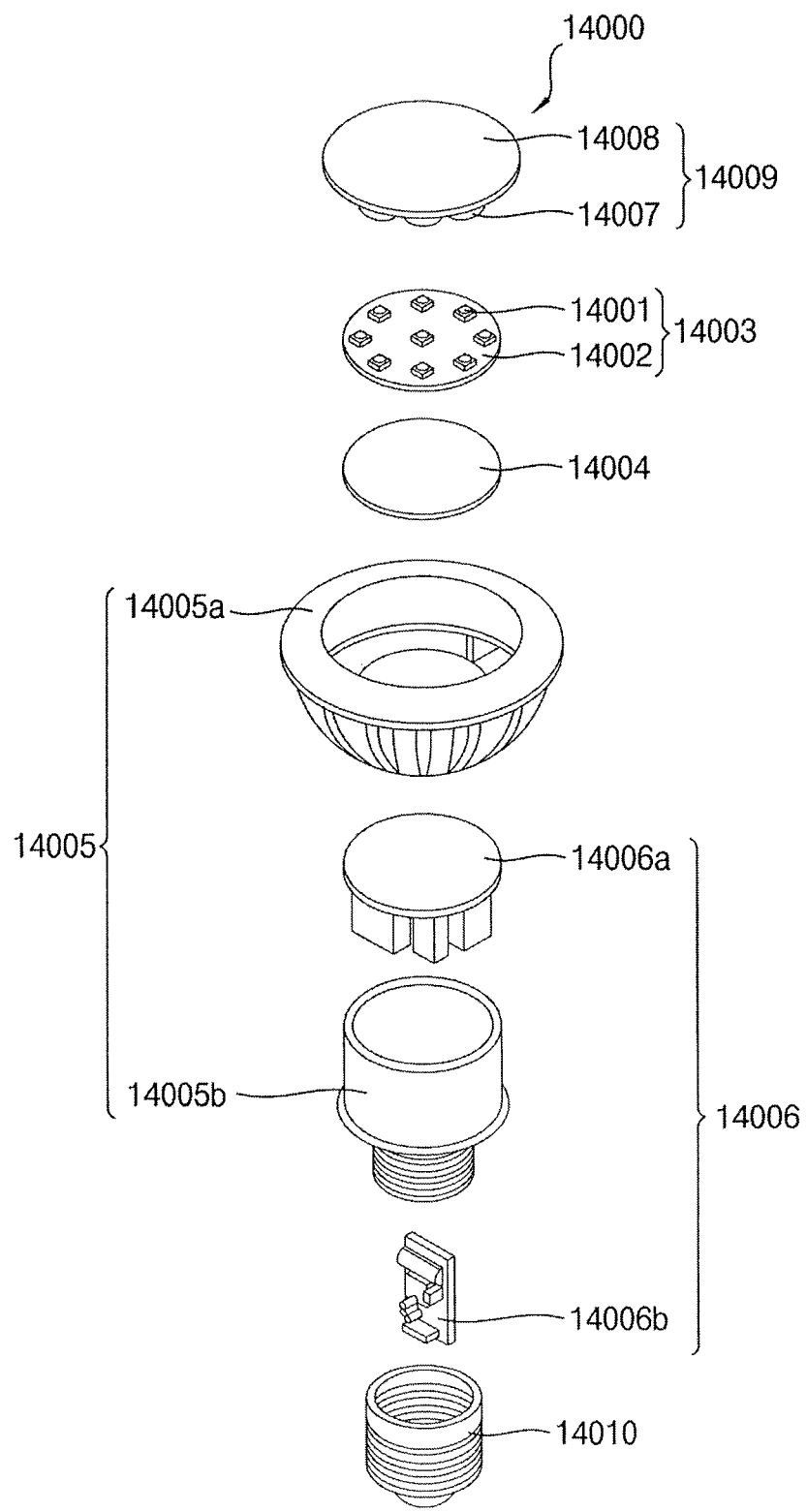
FIG. 8 illustrates an embodiment of a lighting device.

FIG. 8 illustrates another embodiment of a lighting device 14000 employable in the lighting system of FIG. 1. Referring to FIG. 8, the lighting device 14000 includes a light source unit 14003, heat dissipation units 14004 and 14005 (including 14005a and 14005b), a power unit 14006 (including 14006a and 14006b), an optical unit 14009, and a base unit 14010. The light source unit 14003 may have a light emitting element 14001 and a circuit board 14002 on which the light emitting element 14001 is mounted. The circuit board 14002 may be, for example, an FR4 type printed circuit board (PCB).

Figure 11:
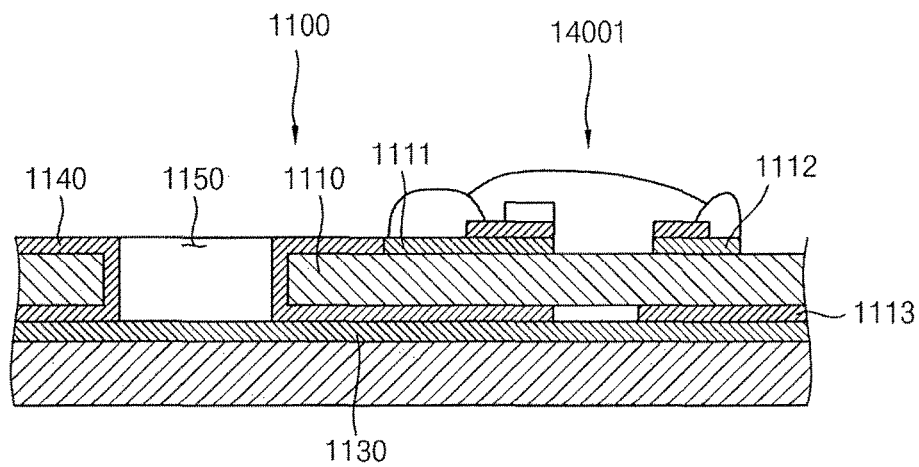
FIGS. 11 to 14 illustrate embodiments of substrates for a light emitting module.

As illustrated in FIG. 11, a circuit board 1100 employable in the present embodiments may include an insulating substrate 1110 having desired (or predetermined) circuit patterns 1111 and 1112 on one surface thereof. An upper thermal diffusion plate 1140 may be on the insulating substrate 1110, such that the upper thermal diffusion plate 1140 is in contact with the circuit patterns 1111 and 1112, to dissipate heat generated by the light emitting element 14001. A lower thermal diffusion plate 1160 is on the other surface of the insulating substrate 1110 and transmits heat transmitted from the upper thermal diffusion plate 1140 outwardly.

The upper thermal diffusion plate 1140 and the lower thermal diffusion plate 1160 may be connected to and exchange heat with each other via at least one through hole 1150, which penetrates through the insulating substrate 1110. Inner walls of the insulating substrate 1110 may be plated to conduct or transfer heat between the upper thermal diffusion plate 1140 and the lower thermal diffusion plate 1160.

In the insulating substrate 1110, the circuit patterns 1111 and 1112 may be formed, for example, by cladding a ceramic with copper or epoxy resin-based FR4 and performing an etching process thereon. An insulating thin film 1130 may be formed by coating an insulating material on a lower surface of the substrate 1110. An antenna pattern 1113 may be formed in the other surface of the insulating substrate 1110. An antenna pattern may be formed to have a meandering shape on the one surface.

Figure 12:
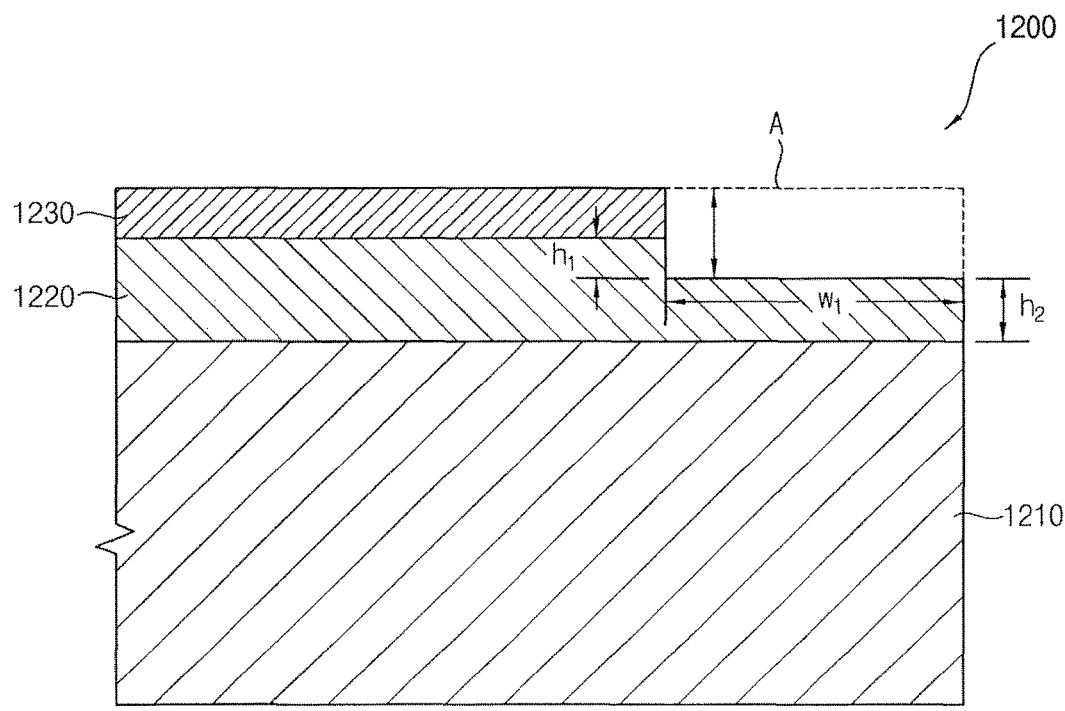

FIG. 12 illustrates another example of a substrate 1200 which includes a first metal layer 1210, an insulating layer 1220 on the first metal layer 1210, and a second metal layer 1230 on the insulating layer 1220. A step region 'A' exposing the insulating layer 1220 may be formed in at least one end portion of the substrate 1200. The first metal layer 1210 may include a material having excellent exothermic characteristics. For example, the first metal layer 1210 may be made of a metal such as aluminum (Al), iron (Fe), or an alloy thereof. The first metal layer 1210 may have a unilayer structure or a multilayer structure. The insulating layer 1220 may be made of a material having insulating properties and may be formed of an inorganic material or an organic material. For example, the insulating layer 1220 may be made of an epoxy-based insulating resin and may include metal powder such as aluminum (Al) powder in order to enhance thermal conductivity. The second metal layer 1230 may be formed of, e.g., a copper (Cu) thin film.

Referring to FIG. 12, in the metal substrate according to this embodiment, an insulation length, which is defined as an width W1 of the insulating layer 1220 exposed at, for instance, one end portion of the insulating layer 1220, may be greater than a thickness of the insulating layer 1220. For example, the insulation length may refer to the length of the insulating layer 1220 exposed between the first metal layer 1210 and the second metal layer 1230. When the metal substrate 1200 is viewed from above, the width of the exposed region of the insulating layer 1220 is the exposure width W1. The region 'A' in FIG. 12 is removed through a grinding process, or the like, during the manufacturing process of the metal substrate.

The second metal layer 1230 and the insulating layer 1120 may be removed to a depth 'h' downwardly from a surface of the second metal layer 1230 to expose the insulating layer 1220 by the exposure width W1, thereby forming a step structure. If the end portion of the metal substrate 1200 is not removed, the insulation length may be equal to a thickness h1+h2 of the insulating layer 1220. By removing a portion of the end portion of the metal substrate 1200, an insulation length equal to approximately W1 may be additionally secured. Thus, when a withstand voltage of the metal substrate 1200 is tested, the likelihood of an electrical shortage between the two metal layers 1210 and 1230 at the end portions thereof may be reduced, minimized, or prevented.

Figure 13:
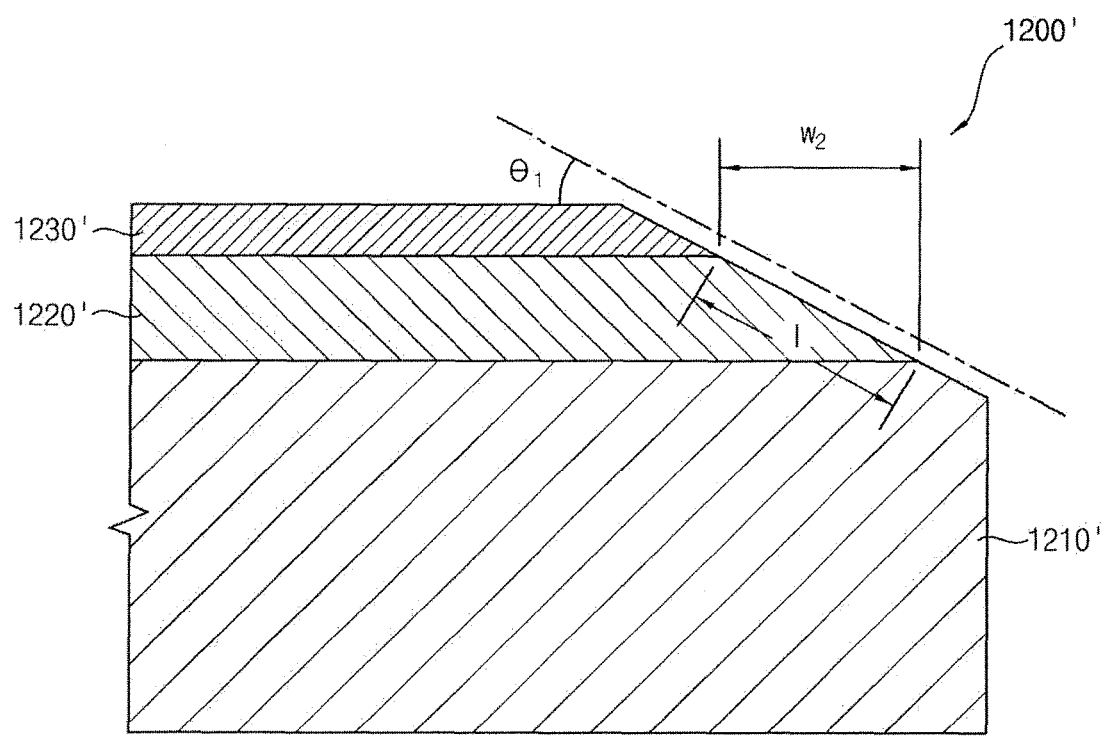

FIG. 13 illustrates an embodiment of a metal substrate structure according to a modification of FIG. 12. Referring to FIG. 13, a metal substrate 1200' includes a first metal layer 1210', an insulating layer 1220' on the first insulating layer 1220', and a second metal layer 1230' on the insulating layer 1220'. The insulating layer 1220' and the second metal layer 1230' include regions removed at a desired (or predetermined) angle of inclination θ1. The first metal layer 1210' may also include a region removed at the desired (or predetermined) angle of inclination θ1.

The angle of inclination θ1 may be an angle between the upper surface of insulating layer 1220' (or the bottom surface of the second metal layer 1230') and the inclined side surface of the insulating layer 1220'. The angle of inclination θ1 may be selected to secure a desired insulation length I in consideration of a thickness of the insulating layer 1220'. The inclination angle θ1 may be selected within the range of 0°<θ1<90° degree. As the inclination angle θ1 decreases, the insulation length I and a projected width W2 of the exposed region of the insulating layer 1220' increases. Thus, in order to secure a larger insulation length, the inclination angle θ1 may be selected to be smaller. For example, the inclination angle may be selected from within the range of 0°<θ1<45°.

Figure 14:
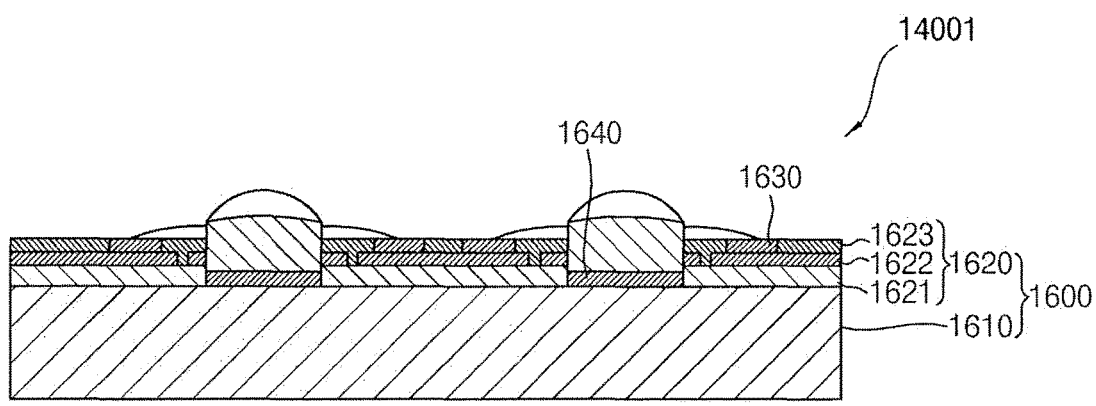

FIG. 14 illustrates another example of the circuit board. Referring to FIG. 14, a substrate 1600 includes a metal support substrate 1610 and resin-coated copper (RCC) 1620 on the metal support substrate 1610. The RCC 1620 may include an insulating layer 1621 and a copper foil 1622 laminated on the insulating layer 1621. A portion of the RCC 1620 may be removed to form at least one recess in which the light emitting element 14001 may be installed. The metal substrate 1600 may have a structure in which the RCC 1620 is partially removed to accommodate the light emitting element 14001 and the light emitting element 14001 is in direct contact with the metal support substrate 1610. Thus, heat generated by the light emitting element 14001 may be directly transmitted to the metal support substrate 1610, thereby enhancing heat dissipation. The light emitting element 14001 may be electrically connected to the metal support substrate 1610. The solders 1630 and 1640 may attach the light emitting element 14001 to the metal support substrate 1610. A protective layer 1623 of a liquid photo solder resist (PSR) may be formed on an upper portion of the copper foil 1622.

The circuit board 14002 in FIG. 8 may have a flat circular plate shape. In another embodiment, the circuit board 14002 may have another shape, e.g., square or any other polygonal shape.

The light emitting elements 14001 may be mounted on and electrically connected to the circuit board 14002. Each of the light emitting elements 14001 may generate light having a desired (or predetermined) wavelength based on power applied from an external source. The light emitting elements 14001 may be, for example, light emitting diodes (LEDs). The light emitting elements 14001 may emit blue light, green light, or red light according to material or materials contained therein, or may emit white light. An antenna pattern may formed on a first surface of the circuit board 14002 or a second surface of the circuit board 14002, opposed to the first surface.

The heat dissipation units 14004 and 14005 may include an internal heat dissipation unit 14004 and an external heat dissipation unit 14005. The internal heat dissipation unit 14004 may be directly connected to the light source unit 14003 and/or the power unit 14006 to transmit heat to the external heat dissipation unit 14005. The power unit 14006 may convert alternating current (AC) power (100V to 240V) supplied through the base unit 14010 to AC or DC power appropriate for lighting (or turning on) the light source unit 14003 and may supply the same. The power unit 14006 may be integrally configured with the circuit board 14002 of the light source unit 14003 or may be configured as a separated unit, for example, using a separate circuit board.

The optical unit 14009 may be a lens-type structure for adjusting the path of light emitted from the light emitting element 14001. The optical unit 14009 may include an internal optical unit 14007 primarily adjusting light emitted from the light emitting element 14001 and an external optical unit 14008 installed around the internal optical unit 14007. The base unit 14010 may have threads to allow for coupling to a socket of an existing light bulb.

Figure 9:
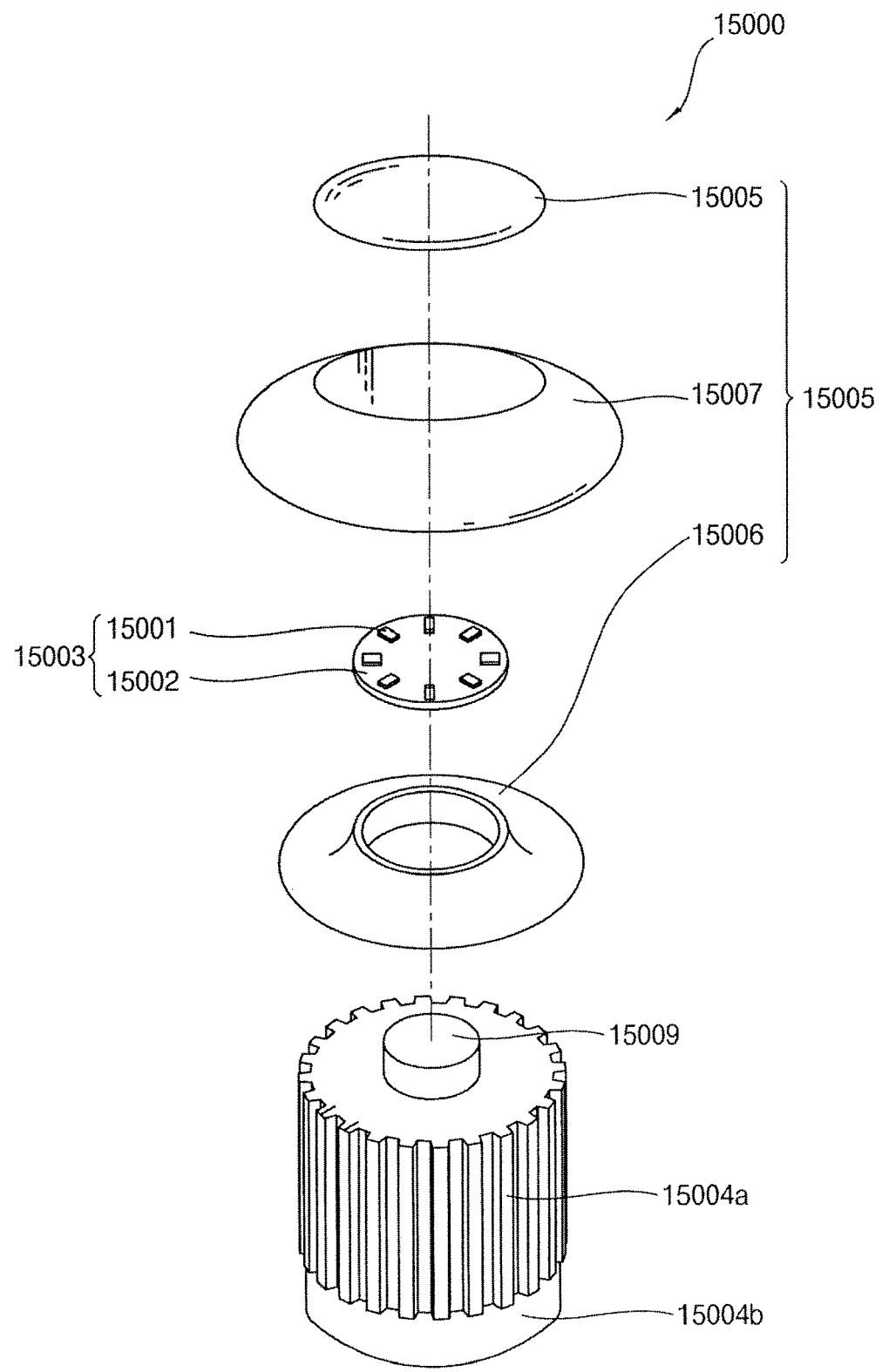
FIG. 9 illustrates another embodiment of a lighting device.

FIG. 9 illustrates another embodiment of a lighting device 15000, which may have the same or similar structure as the example embodiment of FIG. 8 except for an optical unit 15008.

The optical unit 15008 may include a first reflective unit 15005 and a second reflective unit 15006. The first reflective unit 15005 may face a light source unit 15003 to reflect light emitted from a light emitting element 15001 of the light source unit 15003. The first reflective unit 15005 may have, for example, a disk-like shape and may have a reflective surface on a lower surface thereof to reflect light emitted from the light source unit 15003. The reflective surface of the first reflective unit 15005 may be a flat surface or a curved surface and may be larger than the light source unit 15003.

The second reflective unit 15006 may be a region re-reflecting light reflected from the first reflective unit 15005. The second reflective unit 15006 may have a shape corresponding to the first reflective unit 15005 and may be in a peripheral region of the light source unit 15003. The second reflective unit 15006 may have a curved surface sloped downward away from the light source unit 15003. For example, the first reflective unit 15005 may be above the light source unit 15003, and the second reflective unit 15006 may be below the light source unit 15003.

At least one of the first reflective unit 15005, the light source unit 15003, or the second reflective unit 15006 may be symmetrical with respect to a central axis M of the lighting device 15000. Also, the light source unit 15003 may include a plurality of light emitting elements 15001 spaced apart from the central axis M of the lighting device 15000 by a desired (or predetermined) interval. An antenna pattern may be on a first surface of the circuit board 15002 or a second surface of the circuit board 15002, opposed to the first surface.

The light source unit 15003 may further include a cover encapsulating an internal space including the light source unit 15003. The cover 15007 may have, for example, a tube-like shape penetrating upper and lower portions thereof to connect the first reflective unit 15005 and the second reflective unit 15006. For example, one end of the second reflective unit 15006 may be in contact with the light source unit 15003, and the other end thereof may be in contact with the cover 15007. Also, one end of the cover 15007 may be in contact with the first reflective unit 15005 and the other end thereof may be in contact with the second reflective unit 15006.

Reflective pigment may be coated on an internal region of the cover 15007 to form a reflective portion. A support unit 15009 may be formed on the heat releasing unit 15004 to support the optical unit 15008. The support unit 15009 may be the same as that of the second reflective unit 15006, and thus may replace the second reflective unit 15006.

Figure 10:
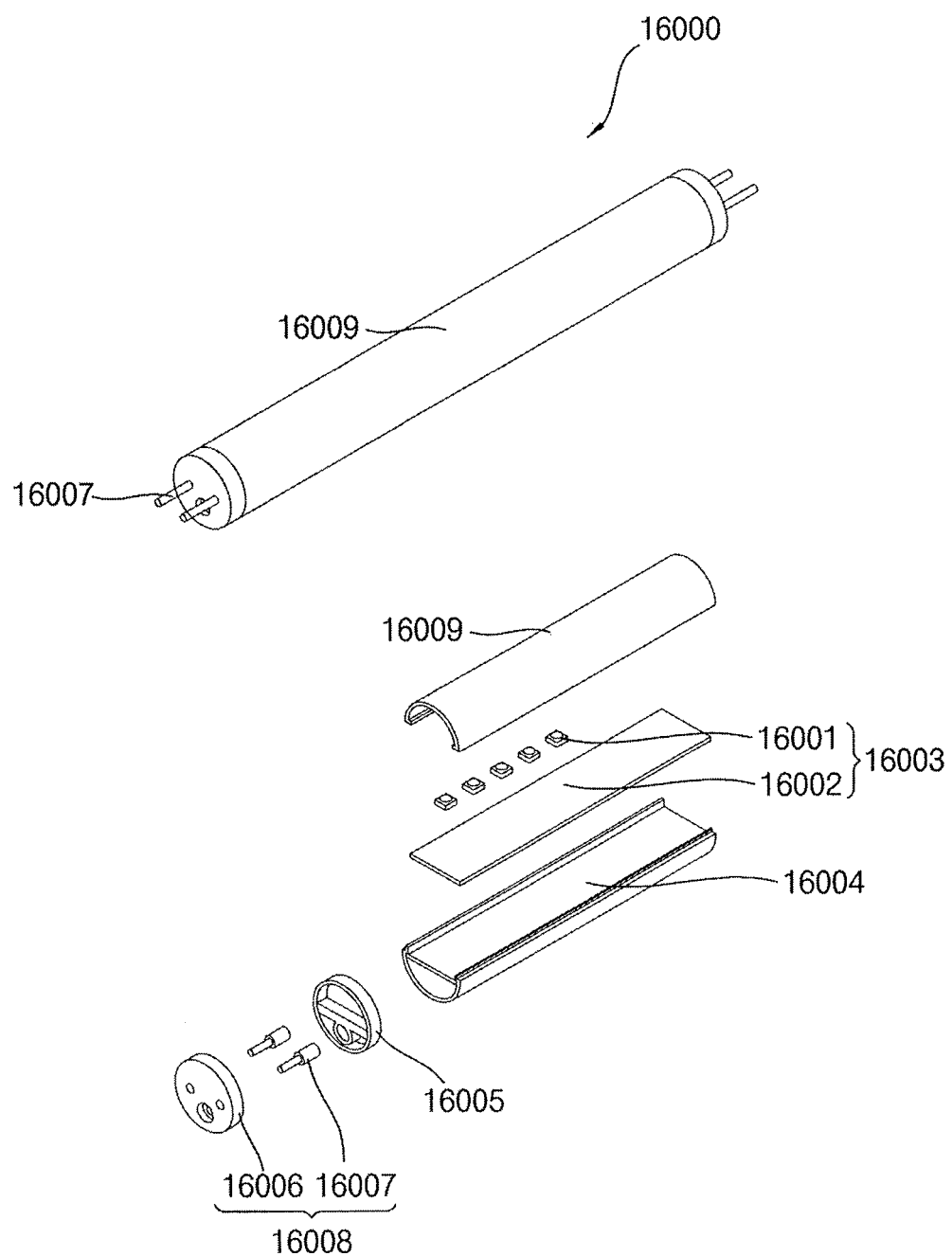
FIG. 10 illustrates another embodiment of a lighting device.

As illustrated in FIG. 10, the lighting device of FIG. 3 may be a fluorescent lamp, rather than a bulb-type lamp. The fluorescent LED lamp 16000 (e.g., an LED-tube) may be installed in an existing fluorescent lamp socket and used. Similar to the bulb-type lamp as described above, the fluorescent LED lamp 16000 may include a light source unit 16003, a heat dissipation unit 16004, a power unit, an optical unit 16009, and a base unit 16008.

The light source unit 16003 includes a circuit board 16002 and a plurality of light emitting elements 16001 mounted on a first surface of the circuit board 16002. The light source unit 16003 may include an antenna pattern formed in first surface of the circuit board 16002 or a second surface of the circuit board 16002, opposed to the first surface. End portions of the heat dissipation unit 16004 may be open in a length direction thereof. For example, the heat dissipation unit 16004 may have a pipe-type structure in which end portions thereof are open.

The base unit 16008 may be provided in at least one of the two opened end portions of the heat dissipation unit 16004 in the length direction and may supply power to the light source unit 16003 from outside. In the present embodiment, both end portions of the heat dissipation unit 16004 are open and the base unit 16008 is provided in both end portions of the heat dissipation unit 16004. In one embodiment, only one side may be open and the base unit 16008 may be provided only in this one side.

The base unit 16008 may be fastened to the both opened end portions of the heat dissipation unit 16004, respectively, to cover them. The base unit 16008 may include an outwardly protruded electrode pin 16007 and a body 16006 to which the pin 16007 is coupled. For example, the base unit 16008 may be fastened to both end portions of the heat dissipation unit 16004 through an adapter 16005. When the lighting unit 16000 is installed in a fluorescent lamp socket, the base unit 16008 may be electrically connected thereto through the electrode pin 16007 to supply power to the light source unit 16003.

The optical unit 16009 may be fastened to the heat dissipation unit 16004 to cover the light source unit 16003. The optical unit 16009 may be made of a light transmitting material. The optical unit 16009 may have a semi-circular curved surface to allow light to be uniformly irradiated outwardly.

In the present example embodiment, the optical unit 16009 has a semi-circular curved shape. In one embodiment, the optical unit 16009 may have a flat quadrangular structure or any other polygonal structure. The configuration of the optical unit 16009 may be modified in various ways, for example, according to illumination designs for irradiating light.

FIGS. 15 to 19 illustrates embodiments of light emitting elements applicable to the lighting device explained in accordance with any of the aforementioned embodiments.

Figure 15:
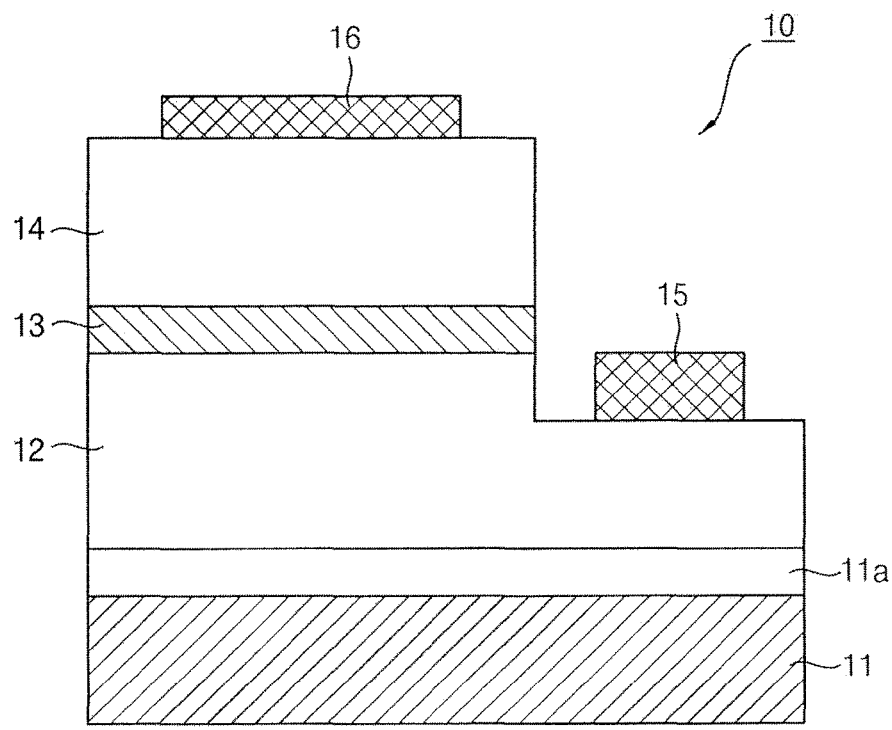
FIGS. 15 to 19 illustrate embodiments of light emitting elements.

Referring to FIG. 15, a light emitting element 10 may include a substrate 11, a first conductivity-type semiconductor layer 12, an active layer 13, and a second conductivity-type semiconductor layer 14. A first electrode 15 may be on the first conductivity-type semiconductor layer 12. A second electrode 16 may be on the second conductivity-type semiconductor layer 14. An ohmic-contact layer may be further selectively provided between the second electrode 16 and the second conductivity-type semiconductor layer 14.

The substrate 11 may be at least one of an insulating substrate, a conductive substrate, or a semiconductor substrate. The substrate 11 may be, for example, sapphire, SiC, Si, $MgAl_2O_4$, MgO, $LiAlO_2$, $LiGaO_2$, or GaN. A homogeneous substrate (e.g., a GaN substrate) may be selected as the substrate 11 for epitaxial growth of a GaN material. A heterogeneous substrate may be, mainly, sapphire, silicon carbide (SiC), or the like. In the case of using a heterogeneous substrate, defects (such as dislocations) may be caused due to a difference in lattice constants between a substrate material and a film material. In addition, warpage may occur at the time of temperature variation due to a difference in coefficients of thermal expansion between the substrate material and the film material. Such a warpage phenomenon may cause cracks in the film. In order to reduce or remove such defects, a buffer layer 11a may be disposed between the substrate 11 and the first conductivity-type semiconductor layer 12 provided as a GaN based layer.

In the case of growing the first conductivity-type semiconductor layer 12 containing GaN on the heterogeneous substrate, dislocation density may be increased due to a mismatch in lattice constants between the substrate material and the film material. Cracks and warpage may occur due to the difference in coefficients of thermal expansion. In order to prevent the dislocation and cracks as described above, the buffer layer 11a may be located between the substrate 11 and the first conductivity-type semiconductor layer 12. The buffer layer 11a may adjust the degree of warpage of the substrate when an active layer is grown and may reduce wavelength dispersion of a wafer.

The buffer layer 11a may include $Al_xIn_yGa_{1-x-y}N$ ($0 \leq x \leq 1$, $0 \leq y \leq 1$), in particular, GaN, AlN, AlGaN, InGaN, or InGaN/AlN. A silicon (Si) substrate has a coefficient of thermal expansion significantly different from that of GaN. A silicon (Si) substrate has a coefficient of thermal expansion significantly different from that of GaN. Thus, in a case of growing a GaN-based film on the silicon substrate, when a GaN film is grown at a high temperature and is subsequently cooled to room temperature, tensile stress is applied to the GaN film due to the difference in the coefficients of thermal expansion between the silicon substrate and the GaN film, causing cracks. An AlN layer may be formed on the substrate 11 in order to form the buffer layer 11a. In this case, a material not including gallium (Ga) may be used to prevent a reaction between silicon (Si) and gallium (Ga). Besides AlN, a material such as SiC, or the like, may also be used. The AlN layer may be grown at a temperature ranging, for example, from about 400° C. to about 1300° C. using an aluminum (Al) source and a nitrogen (N) source. An AlGaN interlayer may be between a plurality of AlN layers in order to control stress in the middle of GaN.

The first conductivity-type semiconductor layer 12 and the second conductivity-type semiconductor layer 14 may be, for example, an n-type impurity doped semiconductor layer and a p-type impurity doped semiconductor layer, respectively. The first conductivity-type semiconductor layer 12 and the second conductivity-type semiconductor layer 14 may be a p-type semiconductor layer and an n-type semiconductor layer, respectively. By way of example, the first conductivity-type semiconductor layer 12 and the second conductivity-type semiconductor layer 14 may be formed of a Group III nitride semiconductor, e.g., a material having a composition of $Al_xIn_yGa_{1-x-y}N$ ($0 \leq x \leq 1$, $0 \leq y \leq 1$, $0 \leq x+y \leq 1$). The materials of the first conductivity-type semiconductor layer 12 and the second conductivity-type semiconductor layer 14 may be different in another embodiment. For example, materials of the first conductivity-type semiconductor layer 12 and second conductivity-type semiconductor layer 14 may be an AlGaInP based semiconductor or an AlGaAs based semiconductor.

The first and second conductivity-type semiconductor layers 12 and 14 may have a single layer structure, but may alternatively have a multilayer structure in which respective layers have different compositions, thicknesses, or the like. For example, each of the first and second conductivity-type semiconductor layers 12 and 14 may include a carrier injection layer capable of improving injection efficiency of electrons and holes, and further may have a superlattice structure formed in various manners. The first conductivity-type semiconductor layer 12 may further include a current spreading layer in a portion thereof adjacent to the active layer 13. The current spreading layer may have a structure, for example, in which a plurality of $Al_xIn_yGa_{1-x-y}N$ layers having different compositions or different impurity contents are repeatedly stacked or may be partially formed of an insulating material layer.

The second conductivity-type semiconductor layer 14 may further include an electron blocking layer in a portion thereof adjacent to the active layer 13. The electron blocking layer may have a structure, for example, in which a plurality of $Al_xIn_yGa_{1-x-y}N$ layers of different compositions are stacked or may have at least one layer omv;ifomh $Al_yGa_{(1-y)}$N. The second conductivity-type semiconductor layer 14 may have a band gap greater than that of the active layer 13 to prevent electrons from passing over the second conductivity-type semiconductor layer 14.

Figure 16:
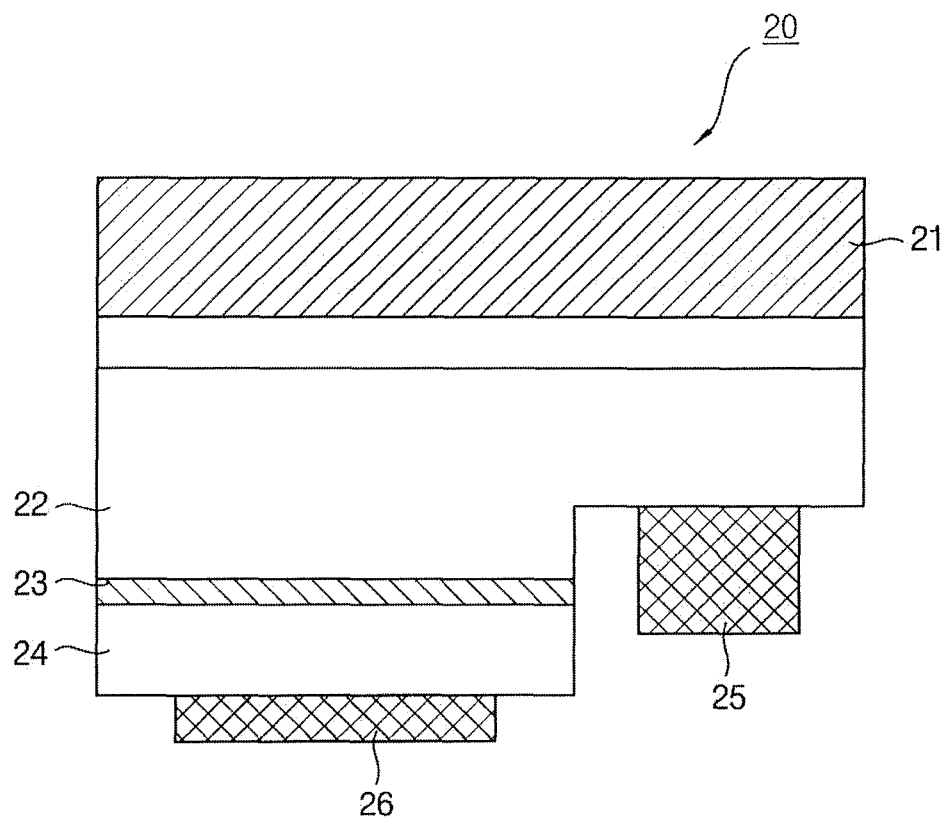

Referring to FIG. 16, a light emitting element 20 according to another exemplary embodiment may include a support substrate 21, first and second conductivity-type semiconductor layers 22 and 24, an active layer 23, first and second electrodes 25 and 26, and the like. The light emitting element 20 may be attached to a circuit board of a light emitting element package, for example, by flip-chip bonding. Since light generated in the active layer 23 is to be emitted upwardly, the support substrate 21 may be formed of a material having light-transmissive properties.

In order to reflect light generated in the active layer 23 and moving in a downward direction, the second electrode 26 may include a material having excellent electrical conductivity and reflectance properties.

Figure 17:
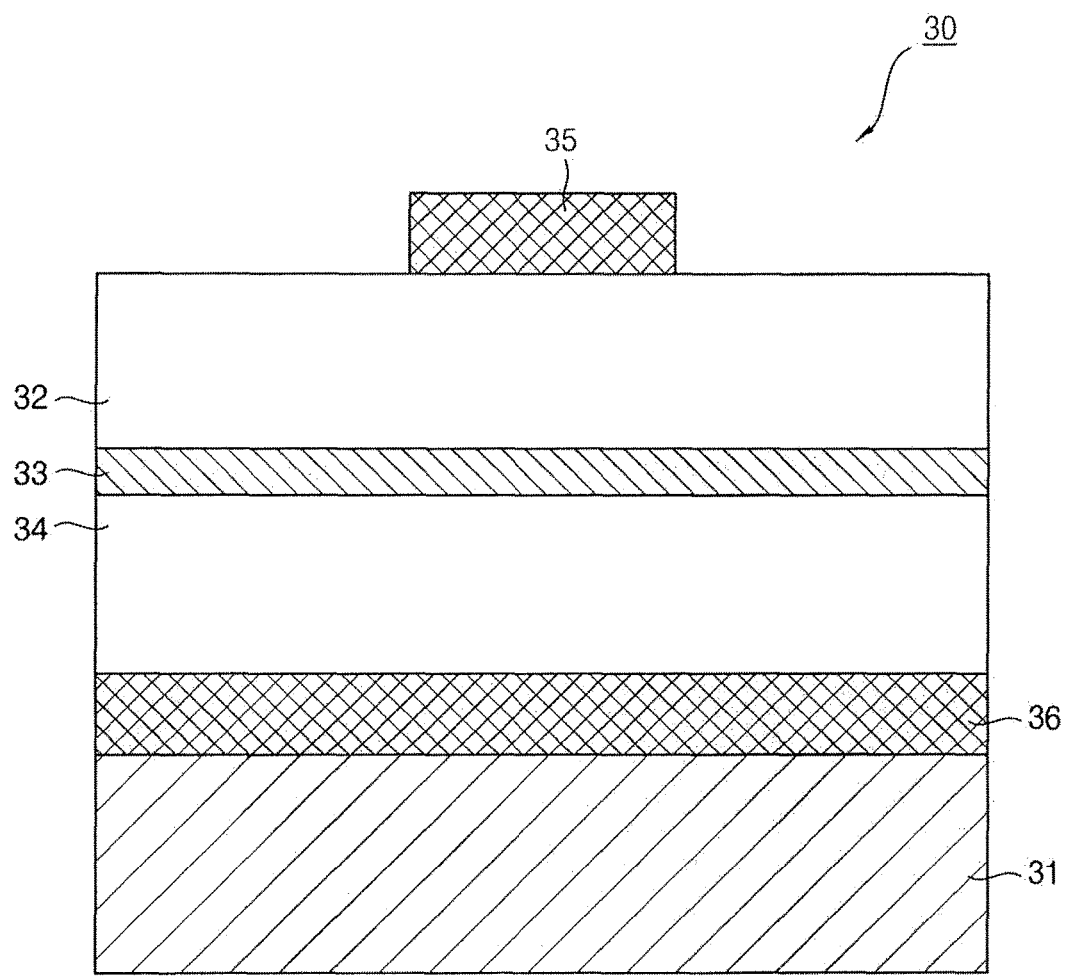

Referring to FIG. 17, a light emitting element 30 according to another exemplary embodiment may include a first conductivity-type semiconductor layer 32, an active layer 33, a second conductivity-type semiconductor layer 34, a first electrode 35 attached to the first conductivity-type semiconductor layer 32, and a second electrode 36 attached to the second conductivity-type semiconductor layer 34.

A conductive substrate 31 may be on a lower surface of the second electrode 36, and may be directly mounted on a circuit board for configuring a light emitting element package. Within the light emitting element package, the conductive substrate 31 may be directly mounted on the circuit board, and the first electrode 35 may be electrically connected to the circuit pattern of the circuit board by a wire, or the like. In a manner similar to the case of the semiconductor light emitting elements 10 and 20, the first conductivity-type semiconductor layer 32 and second conductivity-type semiconductor layer 34 may include an n-type nitride semiconductor and a p-type nitride semiconductor, respectively. The active layer 33 between the first and second conductivity-type semiconductor layers 32 and 34 may have, for example, a multiple quantum well (MQW) structure in which nitride semiconductor layers having different compositions are alternately stacked and may selectively have a single quantum well (SQW) structure.

The first electrode 35 may be on an upper surface of the first conductivity-type semiconductor layer 32. The second electrode 36 may be on a lower surface of the second conductivity-type semiconductor layer 34. Light generated based on the recombination of electrons and holes in the active layer 33 of the light emitting element 30 in FIG. 17 may be emitted to an upper surface of the first conductivity-type semiconductor layer 32 on which the first electrode 35 is disposed. Thus, in order to reflect light generated in the active layer 33 in a direction toward the upper surface of the first conductivity-type semiconductor layer 32, the second electrode 36 may be formed of a material having a high degree of reflectance.

Figure 18:
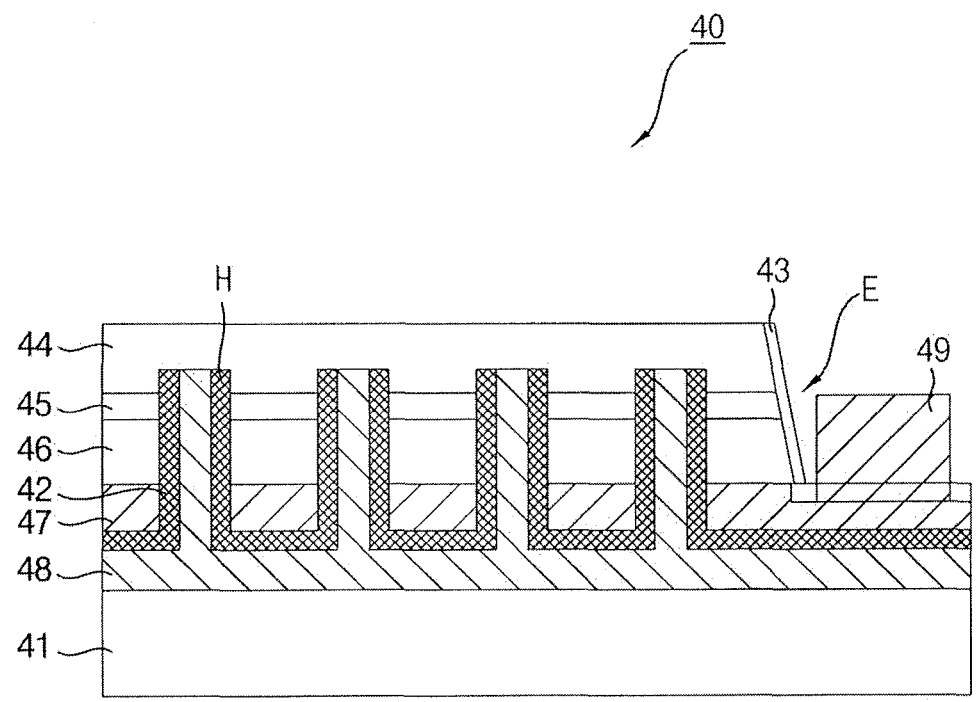

Referring to FIG. 18, a light emitting element 40 may include a first conductivity-type semiconductor layer 44, an active layer 45, a second conductivity-type semiconductor layer 46, a second electrode layer 47, an insulating layer 42, a first electrode 48, and a substrate 41, laminated sequentially. In order to be electrically connected to the first conductivity-type semiconductor layer 44, the first electrode layer 48 includes one or more contact holes H extending from one surface of the first electrode layer 48 to at least a partial region of the first conductivity-type semiconductor layer 44 and electrically insulated from the second conductivity-type semiconductor layer 46 and the active layer 45. However, the first electrode layer 48 may not be included in some of example embodiments.

The contact hole H may extend from an interface between the first electrode layer 48 and the second electrode layer 47, passing through the second electrode layer 47, the second conductivity-type semiconductor layer 46, and the first active layer 45, to the interior of the first conductivity-type semiconductor layer 44. The contact hole H may extend at least to an interface between the active layer 45 and the first conductivity-type semiconductor layer 44. The contact hole H may extend to a portion of the first conductivity-type semiconductor layer 44. Because the contact hole H is formed for electrical connectivity and current spreading, the purpose of the presence of the contact hole H may be achieved when it is in contact with the first conductivity-type semiconductor layer 44. Thus, the contact hole H may not extend to an external surface of the first conductivity-type semiconductor layer 44.

The second electrode layer 47 formed under the second conductivity-type semiconductor layer 46 may be selectively made of a material among silver (Ag), nickel (Ni), aluminum (Al), rhodium (Rh), palladium (Pd), iridium (Ir), ruthenium (Ru), magnesium (Mg), zinc (Zn), platinum (Pt), gold (Au), etc, in consideration of a light reflecting function and an ohmic contact function with the second conductivity-type semiconductor layer 46, and, for example, may be formed by using a process such as sputtering, deposition, or the like.

The contact hole H may penetrate the second electrode layer 47, the second conductivity-type semiconductor layer 46, and the active layer 45 so as to be connected to the first conductivity-type semiconductor layer 44. The contact hole H may be formed, for example, by an etching process, e.g., inductively coupled plasma-reactive ion etching (ICP-RIE), or the like.

The insulating layer 42 may be formed to cover a side wall of the contact hole H and a lower surface of the second conductivity-type semiconductor layer 46. For example, at least a portion of the first conductivity-type semiconductor layer 44 may be exposed by the contact hole H. The insulating layer 42 may be formed by depositing an insulating material such as $SiO_2$, $SiO_xN_y$, or $Si_xN_y$.

The first electrode layer 48 may include a conductive via portion, which is formed by filling the contact hole H with a conductive material. Subsequently, the substrate 41 may be formed on the first electrode layer 48. In this structure, the substrate 41 may be electrically connected to the first conductivity-type semiconductor layer 44 via the conductive via portion of the first electrode layer 48.

The substrate 41 may include Au, Ni, Al, Cu, W, Si, Se, GaAs, SiAl, Ge, SiC, AlN, $Al_2O_3$, GaN, or AlGaN, and may be formed, for example, by plating, sputtering, deposition, bonding, etc.

In order to reduce contact resistance, the number, shape, pitch, and/or contact area of the contact holes H with respect to the first and second conductivity-type semiconductor layers 44 and 46 may be appropriately regulated. The contact holes H may be arranged to have various shapes in rows and columns to improve a current flow. For example, the second electrode layer 47 may have one or more exposed regions in the interface between the second electrode layer 47 and the second conductivity-type semiconductor layer 46, e.g., an exposed region E. An electrode pad unit 49 connecting an external power source to the second electrode layer 47 may be on exposed region E.

The light emitting element 40 in FIG. 18 may include the light emitting structure having the first and second main surfaces opposing one another and having the first and second conductivity-type semiconductor layers 44 and 46 providing the first and second main surfaces, respectively. The active layer 45 may be formed between the first and second conductivity-type semiconductor layers 44 and 46. The contact holes H may extend from a region of the first conductivity-type semiconductor layer 44 and pass through the active layer 45 from the second main surface. The first electrode layer 48 may be on the second main surface of the light emitting structure and connected to a region of the first conductivity-type semiconductor layer 44 through the contact holes H. The second electrode layer 47 may be under the second main surface of the light emitting structure and may be connected to the second conductivity-type semiconductor layer 46. For example, one of the first or second electrodes 48 and 47 may be led out in a lateral direction of the light emitting structure.

Figure 19:
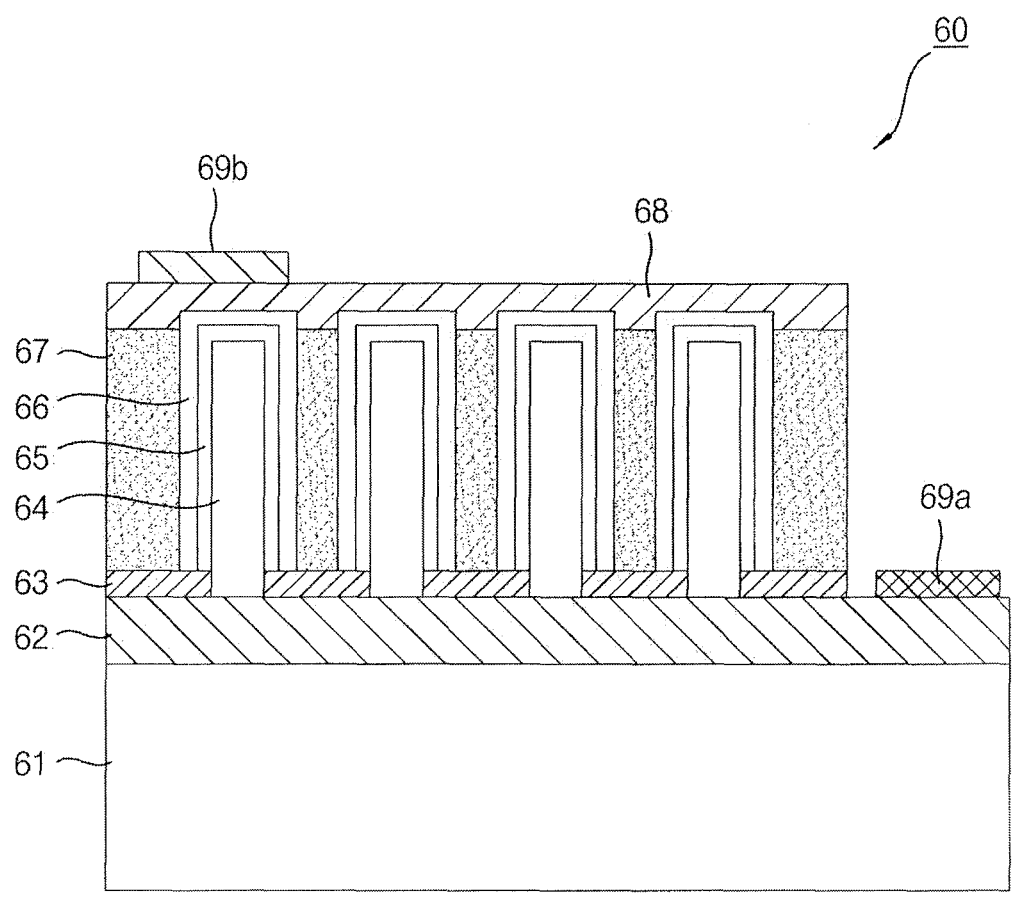

Referring to FIG. 19, a light emitting element 60 may be a nano-scale light emitting structure, e.g. a nano light emitting diode (LED) chip. The light emitting element 60 may include a plurality of nano-scale light emitting structures on a substrate 61. In FIG. 19, the nano-scale light emitting structure has a core-shell structure such as a rod structure. In another example, embodiment, the nano-scale light emitting structure may have a different structure, including but not limited to a pyramid structure.

The light emitting element 60 may include a base layer 62 on the substrate 61. The base layer 62 may provide a growth surface for the nano-scale light emitting structure. The base layer 62 may be, for example, a first conductivity-type semiconductor layer. A masking layer 63 having an open area for the growth of the nano-scale light emitting structure (e.g., the core) may be on the base layer 62. The masking layer 63 may include, for example, a dielectric material such as $SiO_2$ or $SiN_x$.

In the light emitting element 60, a first conductivity-type nano-core 64 may be formed by selectively growing a first conductivity-type semiconductor using the masking layer 63 having an open area. An active layer 65 and a second conductivity-type semiconductor layer 66 may be formed as shell layers on a surface of the nano core 64. Accordingly, the nano-scale light emitting structure may have a core-shell structure, in which the first conductivity-type semiconductor is the nano core and the active layer 65 and the second conductivity-type semiconductor layer 66 enclosing the nano core are shell layers.

The light emitting element 60 may include a filler material 67 filling spaces between the nano-scale light emitting structures. The filler material 67 may structurally stabilize and/or optically improve the nano-scale light emitting structures. The filler material 67 may include a transparent material such as $SiO_2$. In one embodiment, an ohmic contact layer 68 may be on the nano-scale light emitting structures and connected to the second conductivity-type semiconductor layer 66. The light emitting element 60 may include first and second electrodes 69a and 69b connected to the base layer 62 formed of the first conductivity-type semiconductor and the ohmic contact layer 68, respectively.

Figure 20:
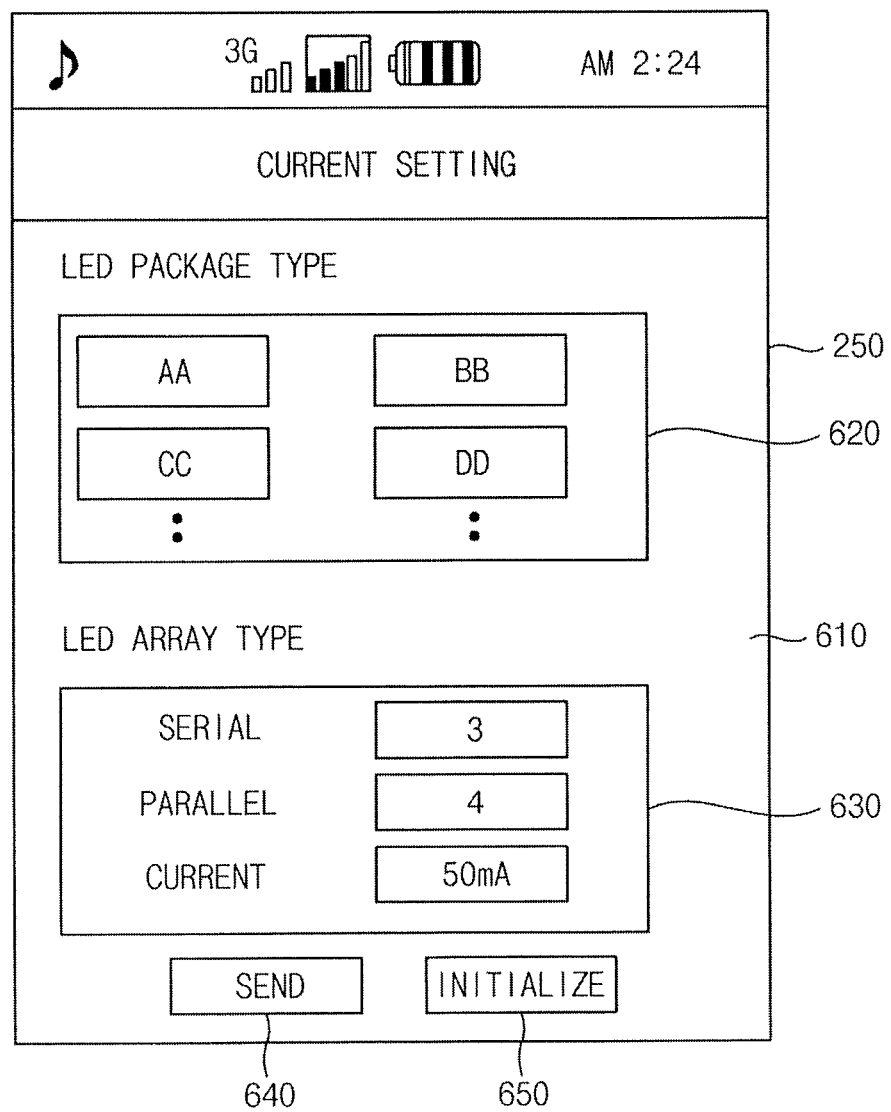
FIGS. 20 and 21 illustrate embodiments of a user interface.
Figure 21:
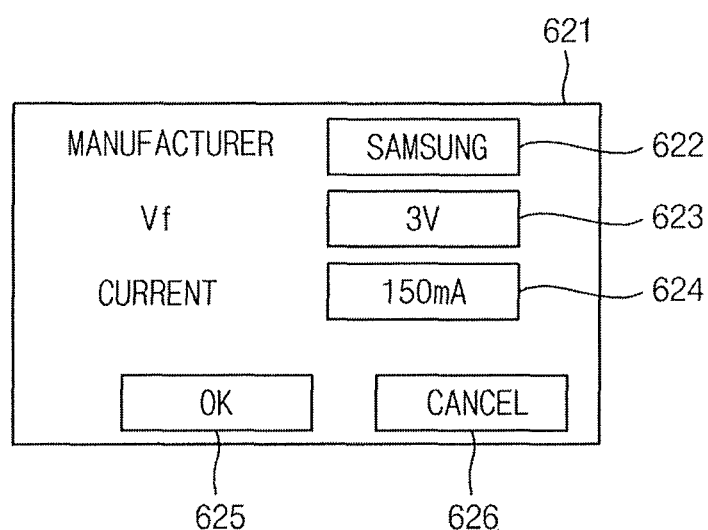

FIGS. 20 and 21 illustrate an embodiment of a user interface to set current applied to the light emitting elements. When the user terminal 200 operates in a current setting mode as illustrated in FIG. 20, the application processor 210 displays, in the display unit 250, a current setting user interface 610 for setting current applied to the light emitting elements 413 or the LED arrays 181-184. A user command for changing the mode of the user terminal 200 to the current setting mode may be input to the input unit 240. The user command for changing the mode of the user terminal 200 to the current setting mode may be performed by executing a dedicated application.

The current setting user interface 610 may include a first window 620 and a second window 630. The first window 620 is for selecting a manufacturer of the light emitting module 140, a driving voltage, and a driving current for operating the light emitting module 140. The second window 630 is for selecting a connection type (e.g., serial or parallel) of light emitting elements in the light emitting module selected in the first window 620 and a current applied to the light emitting module. The current setting user interface 610 may further include a send icon 640 and an initialize icon 650.

When a package type AA is selected in the first window 620, a pop-up window 621 for selecting a driving voltage and a driving current (e.g., a light emitting module attribute) of the light emitting module 140 is displayed in the display unit 250. The pop-up window 621 may include an icon for selecting a manufacturer 622, an icon for selecting the driving voltage 623, an icon for selecting the driving current 624, an OK icon 625, and a cancel icon 626.

When the light emitting module is selecting through the first window 620, the second window 630, and the pop-up window 621, the selected attribute is stored in the memory 230. The selected attribute stored in the memory 230 is wirelessly transmitted to the lighting device 100 as the control data through the wireless communication module 220 when the send icon 640 is pressed. The lighting device 100 receives the selected attribute of the light emitting module 140 via the antenna pattern 145a or 145b and the wireless communication module 120. The driver circuit 110 may set the current applied to light emitting elements 143 or LED arrays 181~184 based on the received attribute.

When the light emitting module 140 is replaced with another light emitting module due to a breakdown, the user terminal 200 may set wirelessly the current applied to light emitting elements according to an attribute of the light emitting module as described with reference to FIGS. 20 and 21. In this case, the driver circuit 110 does not need to be replaced, and thus costs may be reduced.

The lighting system 5 of FIG. 1 may variously change a light property according to the senses of a user or variations of an ambient environment. Light properties are basic elements representing light and may include color, brightness, color temperature, and dimming cycle of the light. A light property may include a plurality of property values. For example, property values refer to different levels of a light property. For example, when a light property is color, color components (e.g., red, green, and blue) correspond to property values. The light properties and property values are determined according to the intensity of light emitted from at least one light-emitting element.

From among the light properties, brightness may be determined according to the amounts of current supplied to the light emitting elements. For example, if the amounts of current supplied to the light emitting elements are large, the brightness is increased. From among the light properties, color may be determined according to a ratio of the currents supplied to the light emitting elements. For example, in order to realize red light, the driver circuit 110 may supply a current only to the red light emitting element, and may not supply currents to the green, blue, and white light emitting elements. Furthermore, the driver circuit 110 may adjust color temperature using a ratio of the currents supplied to the white light emitting elements. Although three primary colors of light are red, green, and blue in the current embodiment, colors obtained by mixing the three primary colors may also be regarded as color as a light property. For example, colors of light may include red, orange, green, blue, white, and the like, and a user may conveniently change the color of light.

The user terminal 200 in the lighting system 5 of FIG. 1 may change the light properties using a user interface similar with the current setting user interface 610.

Figure 22:
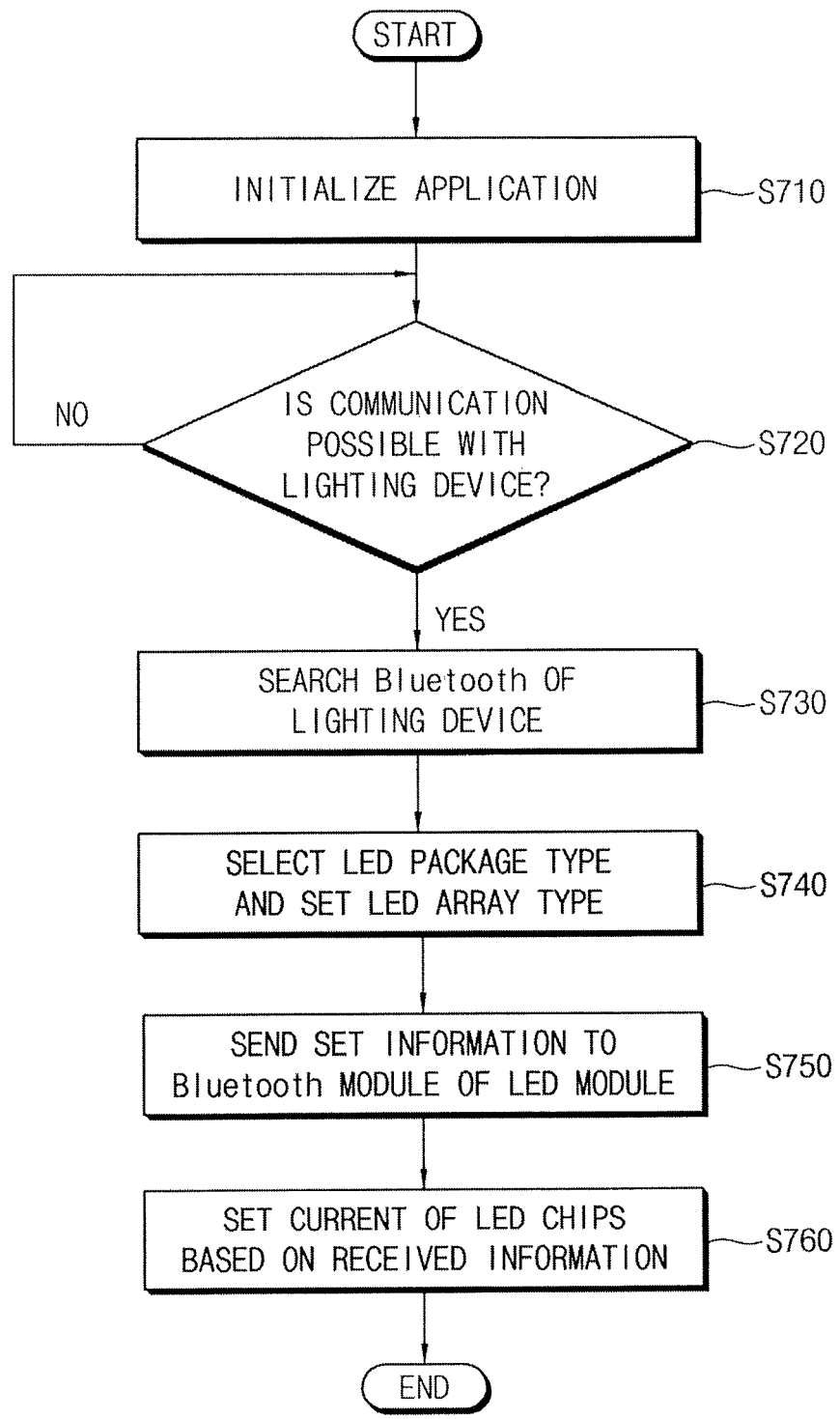
FIG. 22 illustrates an embodiment of a method for operating a lighting system.

FIG. 22 illustrates an embodiment of a method for operating a lighting system, which, for example may correspond to the systems and apparatus illustrated in FIGS. 1 through 7 and 20 through 22. In this method, the lighting system may be the light system 5 including at least one lighting device 100 and a user terminal 200 connected to the at least one lighting device 100 through a wireless communication network. An application processor 210 in the user terminal 200 executes a dedicated application for setting current applied to light emitting elements in a light emitting module 140 in the lighting device 100 (S710).

The application processor 210 determines whether a wireless communication is possible between the user terminal 200 and the lighting device 100 (S720). When the wireless communication is not possible between the user terminal 200 and the lighting device 100 (NO in S720), the application processor 210 determines whether wireless communication is possible between the user terminal 200 and lighting device 100 again.

When the wireless communication is possible between the user terminal 200 and the lighting device 100 (YES in S720), the application processor 210 searches a wireless communication module 120 of the lighting device 100 using a wireless communication module 220 (S730). As a result, the user terminal 200 is paired with the lighting device 100.

When the lighting device 100 is paired with the user terminal 200, for example, as described with reference to FIGS. 20 and 21, the application processor 210 selects an attribute of the light emitting module, which includes a manufacturer of the light emitting module 140, a driving voltage, and a driving current of the light emitting module 140, a connection type of the selected light emitting module, and a current applied to the selected light emitting module using a current setting user interface 610 (S740).

When the attribute of the light emitting module 140 is determined, the user presses the send icon 640 to wirelessly transmit the attribute of the light emitting module 140 to the wireless communication module 120 of the lighting device 100 as the control data CDATA via the wireless communication module 220 and the antenna pattern 145a (S750).

The driver circuit 110 of the lighting device 100 may set current applied to the light emitting elements 143 according to the control signal CTL based on the control data CDATA which is wirelessly transmitted.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, detectors, drivers, converters, processors, user interfaces, display control systems, modules, and other signal generating and signal processing features of the disclosed embodiments may be implemented in logic which, for example, may include hardware, software, or both. When implemented at least partially in hardware, the controllers, detectors, drivers, converters, processors, user interfaces, display control systems, modules, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, detectors, drivers, converters, processors, user interfaces, display control systems, modules, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned embodiments, a lighting device and the lighting system may efficiently receive the control data including current setting information from a user terminal by forming an antenna pattern on a circuit board on which lighting emitting devices are mounted. The embodiments described herein may be applicable, for example, to any smart lighting system which controls operation of smart lighting devices using a user terminal.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A lighting device, comprising:
   a light emitting module including a plurality of light emitting elements and an antenna pattern, the plurality of light emitting elements mounted on a first surface of a circuit board, the antenna pattern in the first surface or a second surface of the circuit board, the second surface opposed to the first surface, wherein the circuit board has a rectangular shape having a longer side and a shorter side, a total length of the antenna pattern is equal to or greater than half of a length of the longer side, and the antenna pattern has a meandering shape that does not overlap the plurality of light emitting elements and the meandering shape is immediately adjacent at least some of the plurality of light emitting elements; and
   a driver to set current applied to the plurality of light emitting elements based on control data including current setting information, the control data to be wirelessly received through the antenna pattern from an external user terminal, wherein the light emitting module includes:
   a wireless communication module directly connected to the antenna pattern, the wireless communication module to receive the control data; and
   a signal converter connected to the wireless communication module, the signal converter to convert the control data to a control signal and to provide the control signal to the driver.

2. The lighting device as claimed in claim 1, wherein the wireless communication module is to provide the control data to the signal converter through a universal asynchronous receiver transmitter (UART) interface.

3. The lighting device as claimed in claim 1, wherein the signal converter is to provide the control signal to the driver according to a digital addressable lighting interface (DALI) interface.

4. The lighting device as claimed in claim 1, wherein the wireless communication module is to receive the control data from the user terminal through a Bluetooth™ protocol.

5. The lighting device as claimed in claim 1, wherein the wireless communication module is to receive the control data from the user terminal through an internet of things (IoT) network.

6. A lighting device, comprising:
a light emitting module including a plurality of light emitting elements and an antenna pattern, the plurality of light emitting elements mounted on a first surface of a circuit board, the antenna pattern in the first surface or a second surface of the circuit board, the second surface opposed to the first surface, wherein the circuit board has a ring shape with a circumference, a total length of the antenna pattern is equal to or greater than a length of the circumference, and the antenna pattern has a meandering shape that does not overlap the plurality of light emitting elements; and
a driver to set current applied to the plurality of light emitting elements based on control data including current setting information, the control data to be wirelessly received through the antenna pattern from an external user terminal, wherein the light emitting module includes:
a wireless communication module directly connected to the antenna pattern, the wireless communication module to receive the control data; and
a signal converter connected to the wireless communication module, the signal converter to convert the control data to a control signal and to provide the control signal to the driver.

7. A lighting system, comprising:
a lighting device including a light emitting module on which a plurality of light emitting elements are mounted, the lighting device to be controlled by control data to be wirelessly received; and
a user terminal to control a current applied to the plurality of light emitting elements based on the control data when the user terminal is connected to the lighting device through a wireless communication link, the lighting device including:
the light emitting module including the plurality of light emitting elements and an antenna pattern, the light emitting elements mounted on a first surface of a circuit board, the antenna pattern in the first surface or a second surface of the circuit board, the second surface opposed to the first surface, wherein the antenna pattern has a meandering shape that does not overlap the plurality of light emitting elements and the meandering shape meanders between the plurality of light emitting elements; and
a driver to set current applied to the plurality of light emitting elements based on the control data including current setting information, the control data to be wirelessly received through the antenna pattern from the user terminal,
wherein the light emitting module includes:
a first wireless communication module directly connected to the antenna pattern, the first wireless communication module to receive the control data; and
a signal converter connected to the first wireless communication module, the signal converter to convert the control data to a control signal and to provide the control signal to the driver.

8. The lighting system as claimed in claim 7, wherein the user terminal includes:

a second wireless communication module to transmit the control data to the first wireless communication module;
a memory to store the control data when the user terminal is connected to the lighting device through the wireless communication link; and
a controller to control the memory and the second wireless communication module, the controller to execute a dedicated application to select the current setting information and to transmit the control data including the current setting information to the lighting device via the second wireless communication module when the user terminal is connected to the lighting device through the wireless communication link.

9. The lighting system as claimed in claim 8, wherein the user terminal includes:
a display to display a light emitting module attribute to select a manufacturer of the light emitting module, a connection relationship of the plurality of light emitting elements, and an amount of the current to be applied to the plurality of light emitting elements; and
an input device to receive a user command to select the light emitting module attribute.

10. The lighting system as claimed in claim 7, wherein the driver includes:
a controller to switch control signals based on the control signal and a rectified power rectified from alternating current (AC) power, the rectified power to be provided to the plurality of light emitting elements; and
a switching circuit including a plurality of switches connected to the plurality of light emitting elements, the switching circuit to control a magnitude of the current applied to the light emitting elements by turning on/off the switches based on the switching control signals.

11. The lighting system as claimed in claim 7, wherein:
the first wireless communication module is to provide the control data to the signal converter through a universal asynchronous receiver transmitter (UART) interface,
the signal converter is to provide the control signal to the driver according to a digital addressable lighting interface (DALI) interface, and
each of the plurality of light emitting elements includes a light emitting diode (LED) chip.

12. A lighting apparatus, comprising:
an antenna to receive control data;
a plurality of light emitters; and
a driver to set a current to be applied to the plurality of light emitters based on the control data received by the antenna, wherein the antenna is to receive the control data based on a predetermined wireless protocol, and
wherein the plurality of light emitters are mounted on a printed circuit board and the antenna is on a surface of the printed circuit board, wherein the antenna has a meandering shape that does not overlap the plurality of light emitters and the meandering shape meanders between the plurality of light emitters.

13. The lighting apparatus as claimed in claim 12, wherein the antenna includes a conductive pattern on the printed circuit board coupled to the driver.

14. The lighting apparatus as claimed in claim 12, wherein each of the plurality of light emitters includes a plurality of light emitting diode chips having plurality of nano-scale light emitting structures.

15. The lighting apparatus as claimed in claim 12, further comprising:
a base with a plurality of threads to be coupled to a lighting socket.

16. The lighting device as claimed in claim 1, wherein the meandering shape meanders between the plurality of light emitting elements.

\* \* \* \* \*